US011126362B2

(12) United States Patent
Patel et al.

(10) Patent No.: US 11,126,362 B2
(45) Date of Patent: Sep. 21, 2021

(54) MIGRATING STORAGE DATA

(71) Applicant: International Business Machines Corporation, Armonk, NY (US)

(72) Inventors: Kushal Patel, Pune (IN); Sumit Mehrotra, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 15/921,154

(22) Filed: Mar. 14, 2018

(65) Prior Publication Data

US 2019/0286359 A1 Sep. 19, 2019

(51) Int. Cl.
| | |
|---|---|
| *G06F 3/06* | (2006.01) |
| *G06F 12/14* | (2006.01) |
| *G06F 13/16* | (2006.01) |
| *G06F 16/11* | (2019.01) |
| *G06F 16/174* | (2019.01) |
| *G11C 16/26* | (2006.01) |
| *G11C 29/52* | (2006.01) |
| *G11C 16/04* | (2006.01) |
| *G11C 16/10* | (2006.01) |
| *G06F 11/10* | (2006.01) |

(52) U.S. Cl.
CPC ............ *G06F 3/0647* (2013.01); *G06F 3/067* (2013.01); *G06F 3/0613* (2013.01); *G06F 12/1408* (2013.01); *G06F 13/1668* (2013.01); *G06F 2212/1052* (2013.01); *G06F 2213/16* (2013.01)

(58) Field of Classification Search
CPC ............... G06F 3/0647; G06F 13/1668; G06F 12/1408; G06F 3/067; G06F 3/0613; G06F 2213/16; G06F 2212/1052; G06F 21/00; G06F 3/0683; G06F 3/0619; G06F 3/065; G06F 2221/2107; G06F 21/78; G06F 3/0622

See application file for complete search history.

(56) References Cited

U.S. PATENT DOCUMENTS

| | | | |
|---|---|---|---|
| 9,081,510 B2 | 7/2015 | Green et al. | |
| 9,251,160 B1 | 2/2016 | Wartnick | |
| 9,639,295 B1* | 5/2017 | Natanzon | ................ G06F 3/065 |
| 2001/0049776 A1* | 12/2001 | Maeda | .................. G06F 3/0617 |
| | | | 711/162 |
| 2005/0071560 A1 | 3/2005 | Bolik | |
| 2005/0108304 A1 | 5/2005 | Wilson et al. | |
| 2008/0307191 A1 | 12/2008 | Lane et al. | |
| 2011/0113259 A1 | 5/2011 | Bilodi et al. | |

(Continued)

OTHER PUBLICATIONS

Petter Svard et al., "Evaluation of delta compression techniques for efficient live migration of large virtual machines", ACM SIGPLAN Notices—VEE '11, vol. 46, Issue 7, Jul. 2011.

*Primary Examiner* — Charles Rones
*Assistant Examiner* — Tong B. Vo
(74) *Attorney, Agent, or Firm* — Kunzler Bean & Adamson

(57) ABSTRACT

Methods that can migrate storage data are provided. One method includes receiving, by a processor, an input/output (I/O) request and, in response to receiving the I/O request, simultaneously transmitting data associated with the I/O request to a first controller and a second controller as a portion of a data migration process. Systems and computer program products that can perform and/or implement the method are also provided.

20 Claims, 21 Drawing Sheets

(56) References Cited

U.S. PATENT DOCUMENTS

| | | |
|---|---|---|
| 2012/0005423 A1 | 1/2012 | Zhuang et al. |
| 2014/0365785 A1 | 12/2014 | Deforest et al. |
| 2016/0335025 A1* | 11/2016 | Vaknin .................. G06F 3/0605 |
| 2018/0300617 A1* | 10/2018 | McBride ............... G06N 3/0454 |
| 2018/0350447 A1* | 12/2018 | Ebsen .................... G11C 16/10 |
| 2019/0005262 A1* | 1/2019 | Surla ..................... G06F 3/0644 |
| 2019/0369901 A1* | 12/2019 | Dornemann .......... G06F 3/0647 |

* cited by examiner

MIGRATING STORAGE DATA

FIELD

The subject matter disclosed herein relates to storage networks and systems and, more particularly, relates to methods and systems that can migrate storage data.

BACKGROUND

Transferring data between storage subsystem types and/or computer systems in the event of a change in the existing systems, an upgrade or backing up the data to recover from a disaster, is referred as Data Migration. Preserving and securing data during data migration is important in many industries. As such, conventional storage controllers typically provide a controlled migration process to ensure that all of the data scheduled for transfer is actually transferred, data consistency is maintained across the process of data migration, and the entire process is kept as transparent as possible while running uninterrupted host application input/output (I/O) operations. Data Migration generally occurs under one or more of the following circumstances: relocation of a data center, an upgrade in the existing storage system (e.g., moving or upgrading to a system that includes improved resources (e.g., memory, size, processor capabilities, etc.)), moving to improved hardware platforms, and/or the inclusion of new and/or improved functions and/or facilities with different data storage hardware, among other possible circumstances.

Typically, data migration occurs during read or write operations performed on a storage system. During read operations, data is migrated by first discontinuing I/O operations on the source device(s) and target device(s). During this discontinue phase, the source device(s) queue I/O operations in a virtualization layer and wait for completion of all outstanding I/O requests. Here, the host typically remains unaware of the fact that data migration operations are underway. In a clock cycle after the discontinue phase, the data that is being migrated is read from its storage location and transferred to the host device and/or host application. In a subsequent clock cycle, the same data that was read from its storage location and transferred to the host device and/or host application is again read from its storage location and transferred to its new storage location. As such, conventional storage systems and/or data migration techniques typically utilize at least two (2) clock cycles to transfer data to a host device/application and migrate the data to a new storage location during read operations.

For write operations received while the target data being migrated, some storage systems and/or migration techniques suspend the write operations until the target data is fully migrated to its new storage location. Other storage systems and/or migration techniques perform the write operations on the target data stored on the source storage device(s) during a first clock cycle and then replicate the same write operations on the new storage location during a subsequent clock cycle. As such, conventional storage systems and/or data migration techniques typically suspend write operations on the target data or utilize at least two (2) clock cycles to migrate the data to a new storage location during write operations.

In short, conventional storage systems and/or migration techniques are less efficient than they otherwise could be and/or require more time than they should because at least two clock cycles are utilized for data being migrated during read and write operations. Further, conventional storage systems and/or migration techniques can be even less efficient and/or may require even more time when migrating data during read and write operations if the target data is encrypted and/or compressed.

BRIEF SUMMARY

Methods and systems that can migrate storage data are provided. One method includes a processor receiving an input/output (I/O) request and, in response to receiving the I/O request, simultaneously transmitting data associated with the I/O request to a first controller and a second controller.

A system includes an I/O module that receives I/O requests and, in response to the received I/O requests, performs corresponding I/O operations. The system further includes a data migration module that, in response to receiving an I/O request, simultaneously transmits data associated with the received I/O request to a first controller and a second controller. Here, at least a portion of said modules can include one or more hardware circuits, one or more programmable hardware devices, and/or executable code stored on one or more computer-readable storage media.

Also disclosed are computer program products including a computer-readable storage medium including program instructions embodied therewith that can integrate resources at a disaster recovery site. Some program instructions are executable by a processor and cause the processor to receive an I/O request and, in response to receiving the I/O request, simultaneously transmit data associated with the I/O request to a first controller and a second controller.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIG. 7 is a schematic flow chart diagram illustrating one embodiment of a method for migrating data between storage devices during read operations;

FIG. 8 is a schematic flow chart diagram illustrating another embodiment of a method for migrating data between storage devices during read operations;

FIG. 9 is a schematic flow chart diagram illustrating one embodiment of a method for migrating data between storage devices during write operations; and FIG. 10 is a schematic flow chart diagram illustrating another embodiment of a method for migrating data between storage devices during write operations.

DETAILED DESCRIPTION

Figure 1:
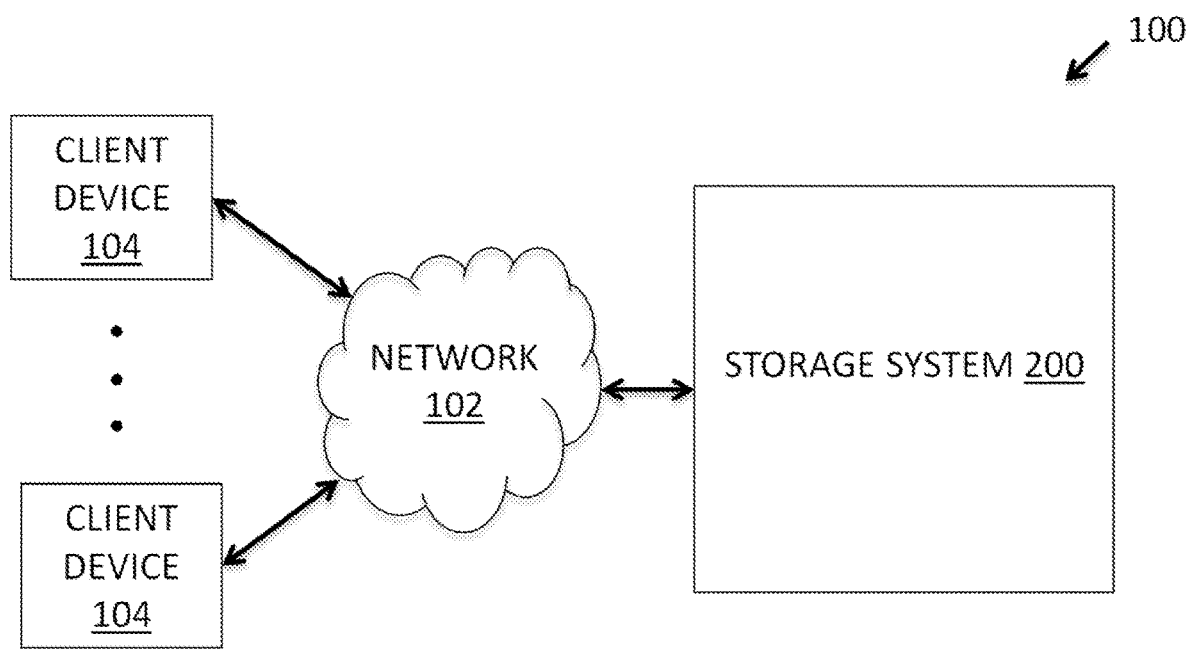
FIG. 1 is a block diagram of one embodiments of a storage network.

Disclosed herein are various embodiments providing methods, systems, and computer program products that can merge parity data for multiple data stripes. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) including a network 102 connecting a set of client devices 104 and a storage system 200. The network 102 may be any suitable wired and/or wireless network 102 (e.g., public and/or private computer networks in any number and/or configuration (e.g., the Internet, an intranet, a cloud network, etc.)) that is known or developed in the future that enables the set of client devices 104 and the storage system 200 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 200 via the network 75. Each client device 75, as part of its respective operation, relies on sending I/O requests to the storage system 200 to write data, read data, and/or modify data. Specifically, each client device 104 can transmit 110 requests to read, write, store, communicate, propagate, and/or transport instructions, data, computer programs, software, code, routines, etc., to the storage system 200 and may comprise at least a portion of a client-server model. In general, the storage system 200 can be accessed by the client device(s) 104 and/or communication with the storage system 200 can be initiated by the client device(s) 104 through a network socket (not shown) utilizing one or more inter-process networking techniques.

Figure 2:
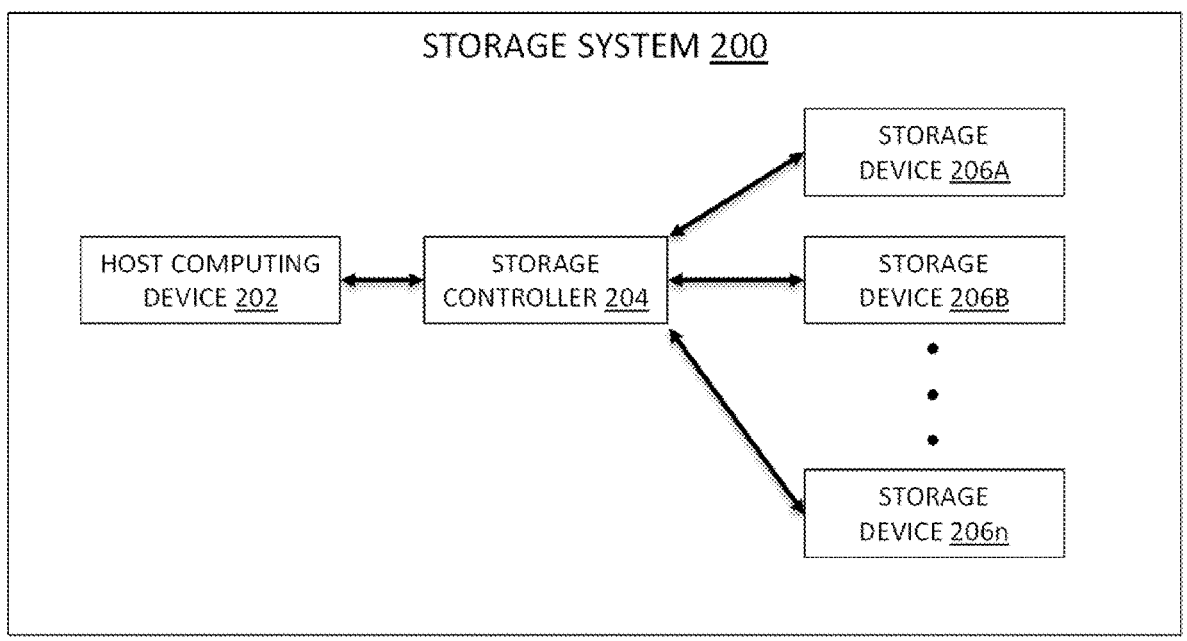
FIG. 2 is a block diagram of one embodiment of a storage system that can be included in the storage network of FIG. 1.

Referring to FIG. 2, the storage system 200, at least in the illustrated embodiment, includes, among other components, a host computing device 202, a storage controller 204, and a set of storage devices 206A, 206B, . . . 206n (also simply referred individually, in various groups, or collectively as storage device(s) 206), in which each storage device 206 includes a set of processors 300 (see e.g., FIGS. 3A and 3B), coupled to and/or in communication with one another.

A host computing device 202 may include any hardware and/or software that is known or developed in the future that can perform computing operations. In various embodiments, the computing device 202 can transmit input/output (I/O) requests (e.g., read request, write requests, and/or read-write requests, etc.) to a storage controller 204. In response to the I/O requests, the storage controller 204 performs I/O operations on a set of storage devices 206 corresponding to the I/O requests and related to one or more suitable services and/or applications, which can be any service and/or application that is known or developed in the future.

A storage controller 204 may include non-volatile/persistent hardware and/or software (e.g., a processor) configured to perform and/or facilitate data storage operations on the storage devices 206, including, but not limited to, data migration, data archiving, data backup, data rebuilding, data mirroring, replicating data, etc. For instance, a storage controller 204 may include non-volatile and/or persistent hardware and/or software to perform short-term and/or long-term data storage operations on the storage devices 206, which may include write operations, read operations, read-write operations, data migration operations, etc., among other operations that are possible and contemplated herein.

In various embodiments, a storage controller 204 may include hardware and/or software that can receive I/O requests (e.g., write request, read request, and/or read-write request, etc.) from the client device(s) 104 (see FIG. 1) and perform corresponding I/O operations (e.g., write operations, read operations, and/or read-write operations, etc.) on the set of storage devices 206 in response thereto. A storage controller 204 may further include hardware and/or software for executing instructions in one or more applications to manage storage operations on the storage system 100 and/or the functionality of the set of storage devices 206.

In some embodiments, a storage controller 204 may include a data migration module 208 that can simultaneously or substantially simultaneously transit write commands to multiple storage devices 206. In additional or alternative embodiments, the data migration module 208 can transmit a migration command to a source storage device 206 instructing the source storage device 206 to transmit, migrate, write, and/or otherwise transfer data stored in the source storage device 206 to a target storage device 206. In some embodiments, the migration command can comprise a read command and/or comprise at least a portion of a read command.

In various embodiments, a storage controller 204 may be configured to receive write requests from the host computing device 202 while migrating data stored in one or more storage devices 206 related and/or associated with data in the write request. In response to a received write request, the data migration module 208 can simultaneously or substantially simultaneously transmit a write command including the data related to and/or associated with the data being migrated to a plurality of storage devices 206. For example, while data is being migrated from storage device 206B to storage device 206A and in response to a write request including data related to the data being migrated, the data migration module 208 can simultaneously or substantially simultaneously transmit a write command including data related to the data being migrated to the storage device 206A and the storage device 206B. That is, the data in the write request can be simultaneously or substantially simultaneously written to the storage device 206A and the storage device 206B via respective write commands from the data migration module 208 and/or storage controller 204. In other words, the data migration module 208 can simultaneously or substantially simultaneously issue a first write command to the storage device 206A and a second write command the storage device 206B to write the data included in the write request from the host computing device 202 respectively therein.

In various additional or alternative embodiments, a storage controller 204 may be configured to receive read requests from the host computing device 202. In response to a received read request, the storage controller 204 can transmit a read command to the storage device(s) 206 that are storing the data corresponding to the read request. In response to receiving the requested data from the storage device(s) 206, the storage controller 204 can transmit the requested data to the host computing device 202.

The storage devices 206 may be any suitable type of device and/or system that is known or developed in the future that can store computer-useable data. In various embodiments, a storage device 206 may include one or more non-transitory computer-usable mediums (e.g., readable, writable, readable-writable, etc.), which may include any non-transitory and/or persistent apparatus or device that can contain, store, communicate, propagate, and/or transport instructions, data, computer programs, software, code, routines, etc., for processing by or in connection with a computer processing device.

Further, communication between the storage devices 206 and the storage controller 204 may be employed using any suitable type of communication architecture and/or protocol that is known or developed in the future capable of enabling multiple computing devices and/or nodes to communicate with one another. Examples of suitable communication architectures and/or protocols include, but are not limited to, InfiniBand (IB), Remote Direct Memory Access (RDMA), IB over RDMA Internet Protocol (IP), Transmission Control Protocol/Internet Protocol (TCP/IP), Ethernet, Fibre Channel (FC), Advanced Technology Attachment (ATA), ATA-over-Ethernet (AoE), parallel ATA (PATA), Serial ATA (SATA), Small Computer System Interface (SCSI), Internet Small Computer System Interface (iSCSI), an optical network, Network File System (NFS), FC-over-IP (FCIP), Non-Volatile Memory Express (NVMe), NVMe-over-RDMA, iSCSI Extensions for RDMA (iSER), SCSI RDMA Protocol (SRP), Fibre Channel-over-Ethernet (FCoE), Enterprise Systems Connection (ESCON), Fibre Connection (FICON), ATA-Over-Ethernet (AoE), and/or Internet Fibre Channel Protocol (IFCP), etc., among other examples of communication architectures and/or protocols and combinations thereof that are possible and contemplated herein.

In some embodiments, a set of storage devices 206 may include a set of computer-readable, computer-writable, and/or computer-useable disks (e.g., disk drives, hard drives, hard disk drives (HDDs), etc.). The set of disks may be arranged to implement a redundant array of independent disks (RAID) configuration, a just of bunch of disks (JBOD) configuration, a concatenation (SPAN or BIG) configuration, or a massive array of idle drives (MAID) configuration, etc., among other suitable disk architectures and/or configurations that are known or developed in the future.

In various embodiments, the set of storage devices 206 can be configured to store data and/or migrate stored data between two or more storage devices 206. To perform the data storage operations and/or data migration operations, each storage device may include a processor 300A or processor 300B, as discussed with reference to FIGS. 3A and 3B, respectively. In some embodiments, the processor(s) 300A and/or 300B may be considered backend processors and/or storage controllers with respect to the storage controller 204 and/or the one or more processors included in the storage controller 204.

While FIG. 2 is shown as including three (3) storage devices 206, various other sets of storage devices 206 may include other quantities of storage devices 206 and are not limited to three storage devices 206. That is, other embodiments may include a smaller quantity of storage devices than three or may include greater than three storage devices 206.

Figure 3A:
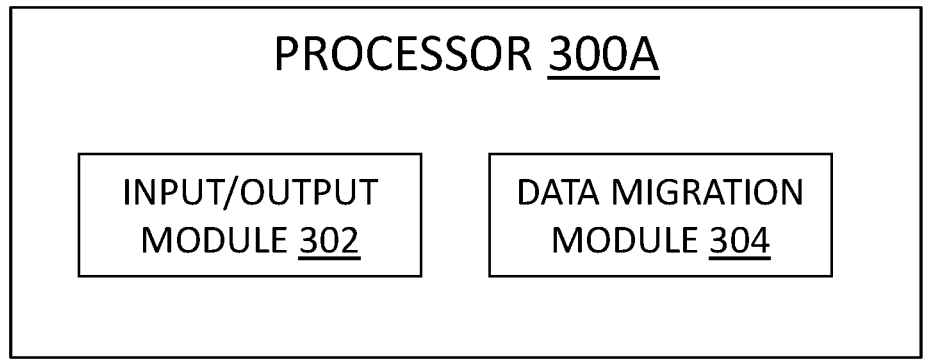
FIGS. 3A and 3B are block diagrams of various embodiments of a processor that can be included in the storage system of FIG. 2.

With reference to FIG. 3A, FIG. 3A is a block diagram of one embodiment of a processor 300A that can be included in and/or as a portion of a storage device 206. At least in the illustrated embodiment, a processor 300A may include, among other components, an I/O module 302 and a data migration module 304 coupled to and/or in communication with one another.

An I/O module 302 may include any suitable hardware and/or software that can perform read operations, write operations, and/or read-write operations in response to read commands and write commands received from a storage controller 204. For example, in response to a write command, the I/O module 302 will write or save data received from the storage controller 204 to a suitable storage medium for temporary or long-term storage. In another example, the I/O module 302 will retrieve data from a suitable storage medium and transmit the retrieved data to the storage controller 204 in response to receiving a read command from the storage controller 204.

A data migration module 304 may include any suitable hardware and/or software that can migrate and/or transfer data stored in one storage device to another storage device. For example, the data migration module 304 can migrate (e.g., transmit, write, read-write, etc.) data stored in storage device 206A to storage device 206B.

In various embodiments, the data migration module 304 can migrate data between storage devices in tandem with performing read operations in response to receiving a read command from the storage controller 204. For example, in response to receiving a read command from the storage controller 204, the data migration module 304 can simultaneously or substantially simultaneously transmit data stored in a first storage device 206 to a second storage device 206 and to the storage controller 304. In other words, the data stored in the first storage device 206 can be simultaneously or substantially simultaneously read to the storage controller 204 and to the second storage device 206. Here, the storage controller 204 can transmit the data read from the first storage device 206 to the host computing device 202 and the second storage device 206 can temporarily store or store the data read from the first storage device 206 on a long-term basis.

Figure 3B:
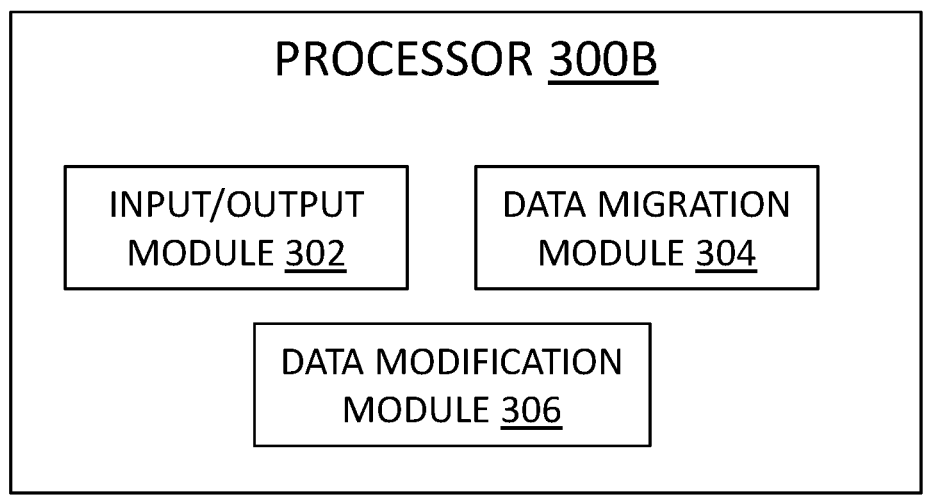

Referring to FIG. 3B, FIG. 3B is a block diagram of another embodiment of a processor 300B that can be included in and/or as a portion of a storage device 206. At least in the illustrated embodiment, a processor 300B may include, among other components, an I/O module 302 and a data migration module 304 coupled to and/or in communication with one another similar to the various embodiments of processor 300A discussed above with reference to FIG. 3A. In addition, a processor 300B can further include a data modification module 306 coupled to and/or in communication with the I/O module 302 and the data migration module 304.

A data modification module 306 may include any suitable hardware and/or software that can modify data that is being written to and/or read from a storage device 206. A data modification module 306 may modify the data being written to and/or read from a storage device 206 utilizing any suitable modification technique and/or method that is known or developed in the future.

Figure 4A:
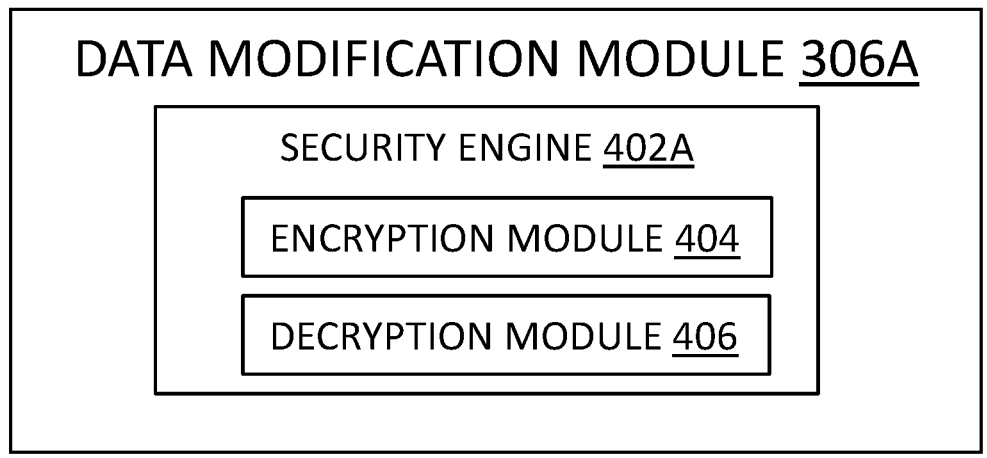
FIGS. 4A through 4E are block diagrams of various embodiments of a data modification module that can be included in a processor of FIGS. 3A and 3B.

With reference to FIG. 4A, in some embodiments, a data modification module 306A includes a security engine 402A. A security engine 402A may include any suitable hardware and/or software that can enable data to be more securely stored on a storage device 206 and/or prevent unauthorized access to the data stored on a storage device 206. In various embodiments, a security engine 402A may include an encryption module 404 and/or a decryption module 406.

An encryption module 404 may include any suitable hardware and/or software that is known or developed in the future that can encrypt data, enable data to be more securely stored, and/or otherwise prevent data that is being stored on a storage device 206 from unauthorized access. The data stored on the storage device 206 may be encrypted using any encryption method and/or technique that is known or developed in the future. In some embodiments, an encryption technique that utilizes an encryption key and/or other similar code to encrypt the data being stored on a storage device 206, which can be a target or source storage device 206.

In various embodiments, an encryption module 404 can encrypt the data in a write command received from a storage controller 204 prior to writing the data to a computer-useable storage medium in a target storage device 206. In additional or alternative embodiments, an encryption module 404 can encrypt data that is being migrated from a source storage device 206 upon receipt of the data from the storage device 206 and prior to writing the data to a computer-useable storage medium in a target storage device 206.

A decryption module 406 may include any suitable hardware and/or software that is known or developed in the future that can decrypt data and/or otherwise enable data that is being stored on a storage device 206 to be accessed by an authorized entity and/or user. The data stored on the storage device 206 may be decrypted using any decryption method and/or technique that is known or developed in the future. In some embodiments, a decryption technique that utilizes a decryption key and/or other similar code to decrypt the data being stored on a storage device 206, which can be a target or source storage device 206. Here, the decryption key and/or code corresponds to and/or complements the encryption key and/or code utilized to encrypt the data being stored on the storage device 206.

In various embodiments, a decryption module 406 can decrypt the data being stored on a target storage device 206 in response to a read command received from a storage controller 204 and prior to transmitting the data to the storage controller 204. In additional or alternative embodiments, a decryption module 404 can decrypt data that is being migrated from a source storage device 206 to a target storage device 206 upon receipt of a data migration command received from the storage controller 204.

Figure 4B:
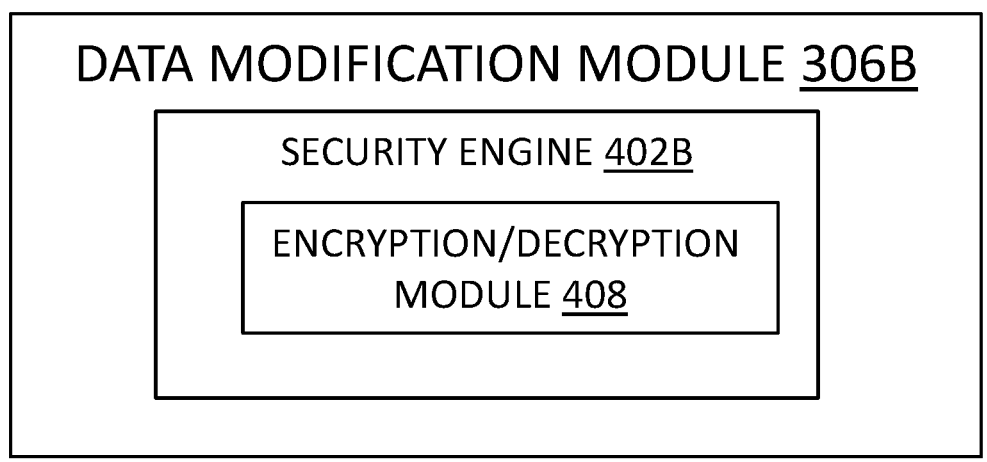

Referring to FIG. 4B, FIG. 4B is a block diagram of another embodiment of a data modification module 306B that includes a security engine 402B. A security engine 402B may include any suitable hardware and/or software that can enable data to be more securely stored on a storage device 206 and/or prevent unauthorized access to the data stored on a storage device 206. At least in the illustrated embodiment, a security engine 402B may include an encryption/decryption module 408. An encryption/decryption module 408 may include any suitable hardware and/or software that can perform encryption and/or decryption operations and/or techniques that are the same as or similar to the operations/techniques performed by encryption module 404 and decryption module 406 discussed above with reference to FIG. 4A.

Figure 4C:
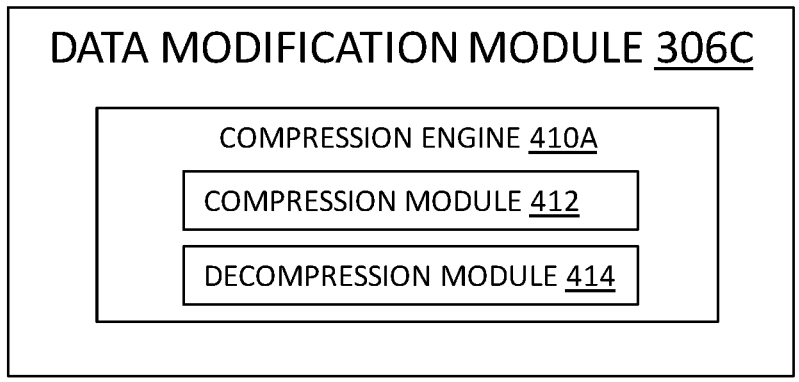

Referring to FIG. 4C, in some embodiments, a data modification module 306C includes a compression engine 410A. A compression engine 410A may include any suitable hardware and/or software that can reduce the size of data being stored on a storage device 206 and/or enable a smaller version of the data to be stored on a storage device 206. In various embodiments, a compression engine 410A may include a compression module 412 and/or a decompression module 414.

A compression module 410 can include any suitable hardware and/or software that is known or developed in the future that can compress data, create a smaller version of the data, and/or otherwise reduce the amount of data that is being stored on a storage device 206. The data stored on the storage device 206 may be compressed using any compression/reduction method and/or technique that is known or developed in the future. In some embodiments, data compression can involve encoding information using fewer bits than the original representation of the data.

In various embodiments, a compression module 410 can compress the data in a write command received from a storage controller 204 prior to writing the data to a computer-useable storage medium in a target storage device 206. In additional or alternative embodiments, a compression module 410 can compress data that is being migrated from a source storage device 206 upon receipt of the data from a source storage device 206 and prior to writing the data to a computer-useable storage medium in a target storage device 206.

A decompression module 414 may include any suitable hardware and/or software that is known or developed in the future that can decompress data and/or otherwise return compressed data on a storage device 206 to its original size and/or state. The data stored on the storage device 206 may be decompressed using any decompression method and/or technique that is known or developed in the future. In some embodiments, a decompression technique utilizes a method/technique that is inverse to the method/technique used to compress the data being stored on a storage device 206. That is, the decompression method/technique corresponds to and/or complements the compression method/technique utilized to compress the data being stored on the storage device 206.

In various embodiments, a decompression module 414 can decompress the data being stored on a storage device 206, which can be a source or target storage device 206, in response to a read command received from a storage controller 204 and prior to transmitting the data to the storage controller 204. In additional or alternative embodiments, a decompression module 414 can decompress data that is being migrated from a source storage device 206 to a target storage device 206 upon receipt of a data migration command received from the storage controller 204.

Figure 4D:
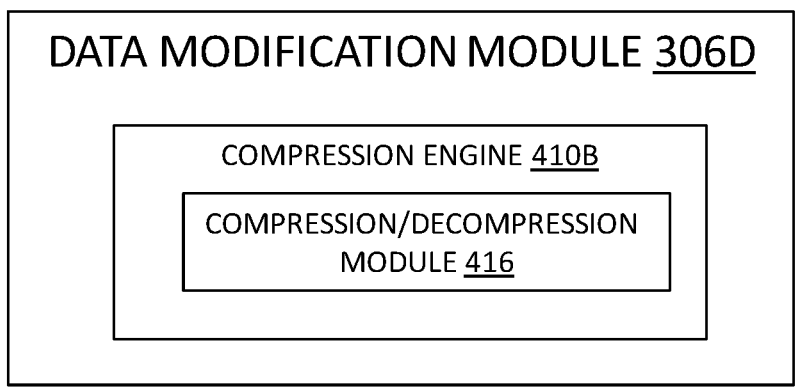

With reference to FIG. 4D, FIG. 4D is a block diagram of another embodiment of a data modification module 306D that includes a compression engine 410B. A compression engine 410B may include any suitable hardware and/or software that can enable a smaller amount of data to be stored on a storage device 206. At least in the illustrated embodiment, a compression engine 410B may include a compression/decompression module 416. A compression/decompression module 416 may include any suitable hardware and/or software that can perform compression and/or decompression operations and/or techniques that are the same as or similar to the operations/techniques performed by compression module 412 and decryption module 414 discussed above with reference to FIG. 4C.

Figure 4E:
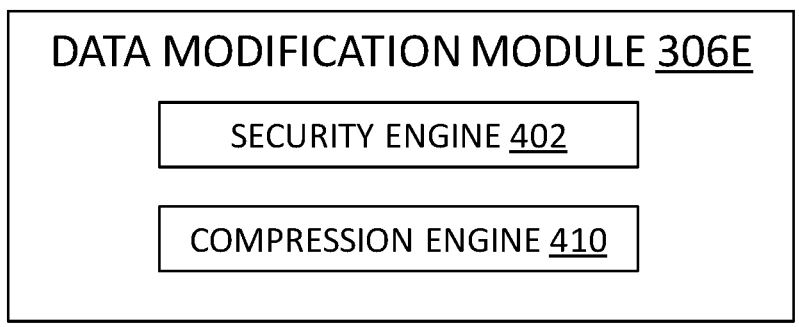

Referring to FIG. 4E, FIG. 4E is a block diagram of another embodiment of a data modification module 306E that includes a security engine 402 and a compression engine 410. A security engine 402 can comprise the security engine 402A discussed above with reference to FIG. 4A and/or the security engine 402B discussed above with reference to FIG. 4B. A compression engine 410 can comprise the compression engine 410A discussed above with reference to FIG. 4C and/or the compression engine 410B discussed above with reference to FIG. 4D.

Figure 5A:
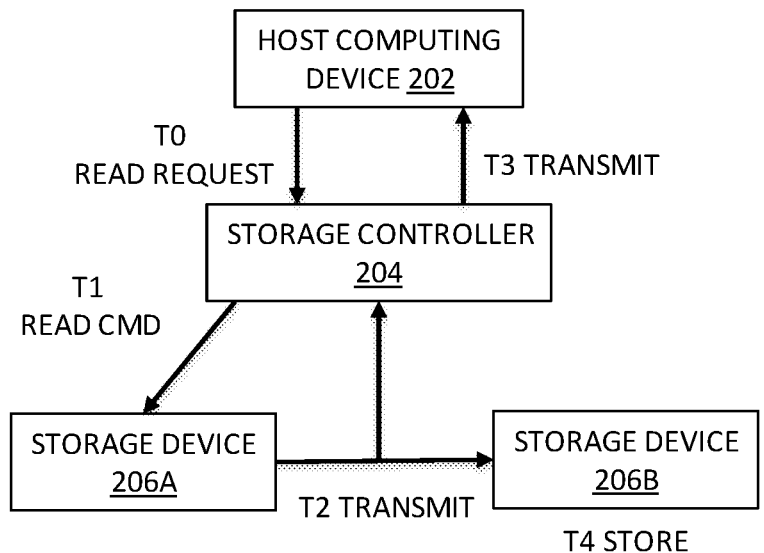
FIGS. 5A through 5P illustrate timing diagrams of various embodiments of migrating data between storage devices during read operations.
Figure 5B:
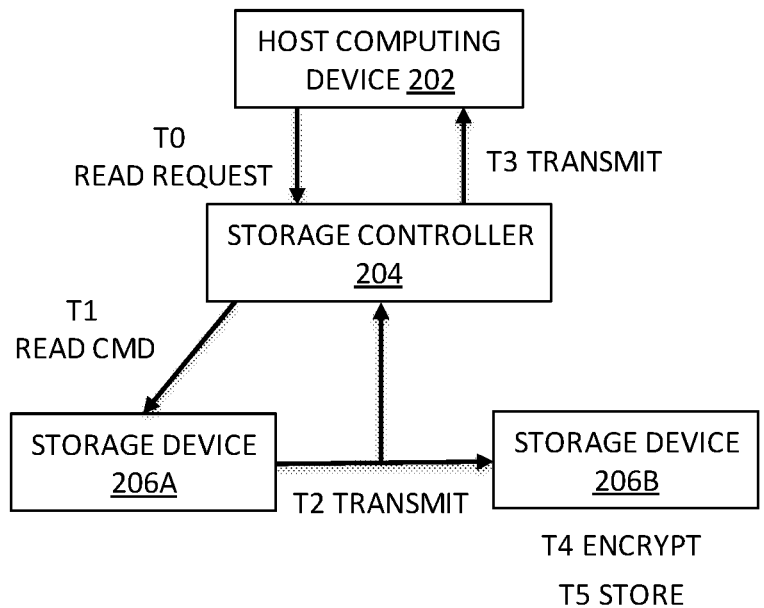
Figure 5C:
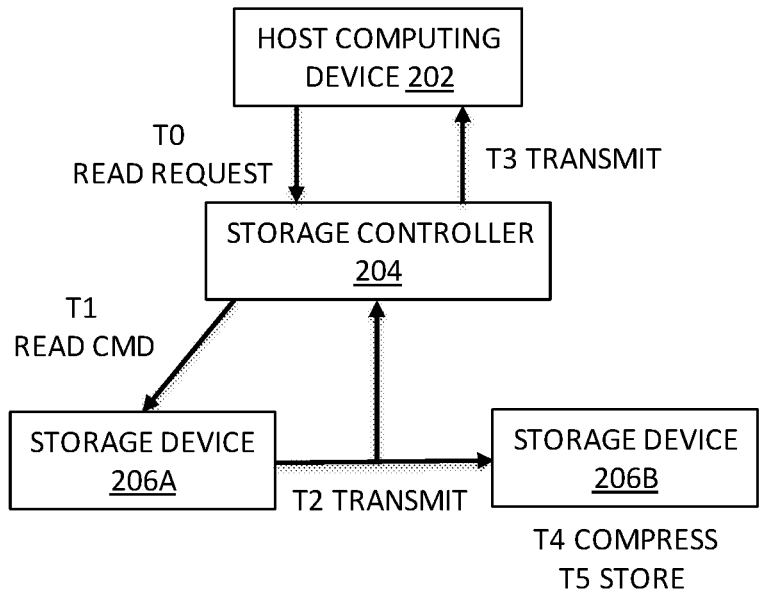
Figure 5D:
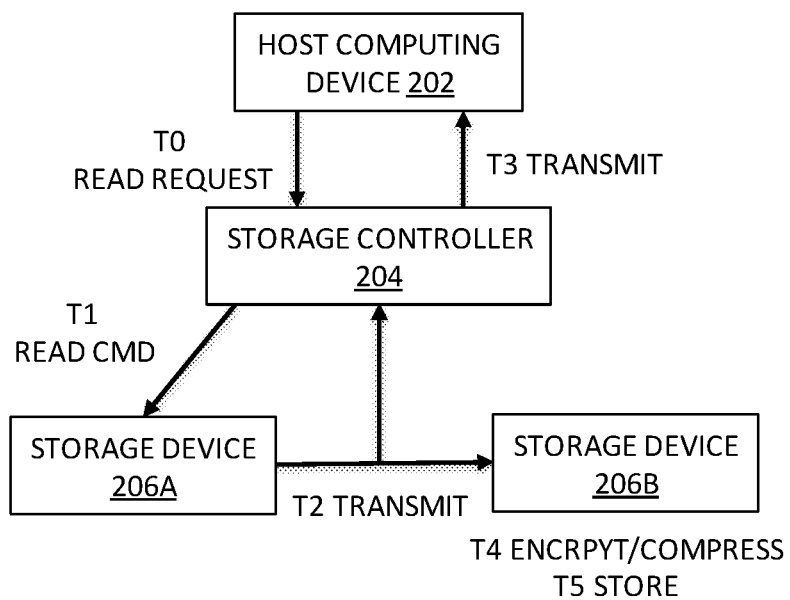
Figure 5E:
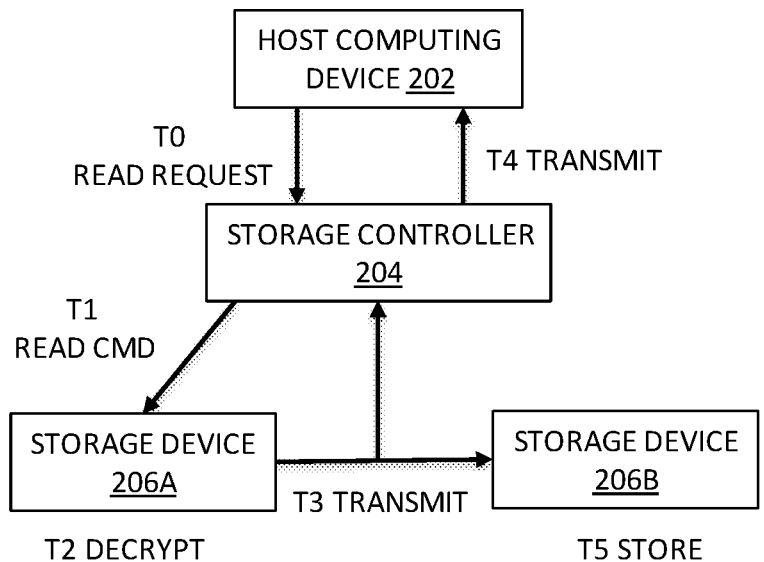
Figure 5F:
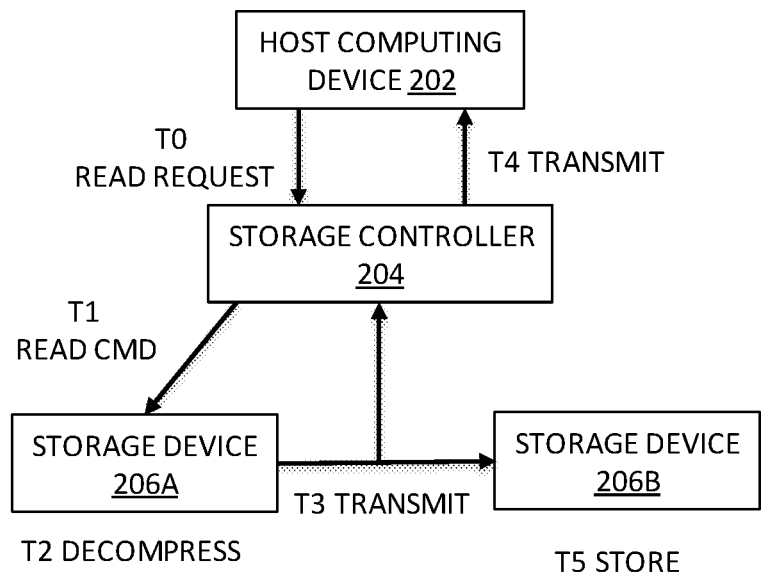
Figure 5G:
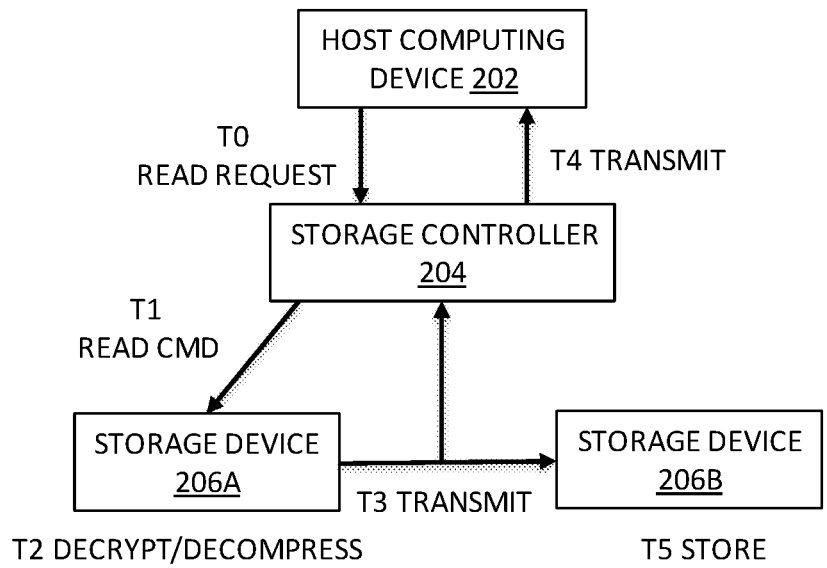
Figure 5H:
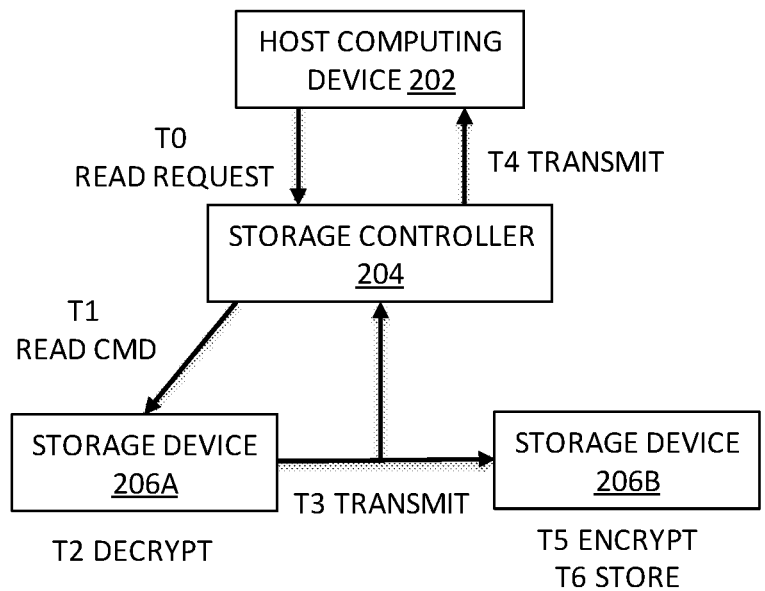
Figure 5I:
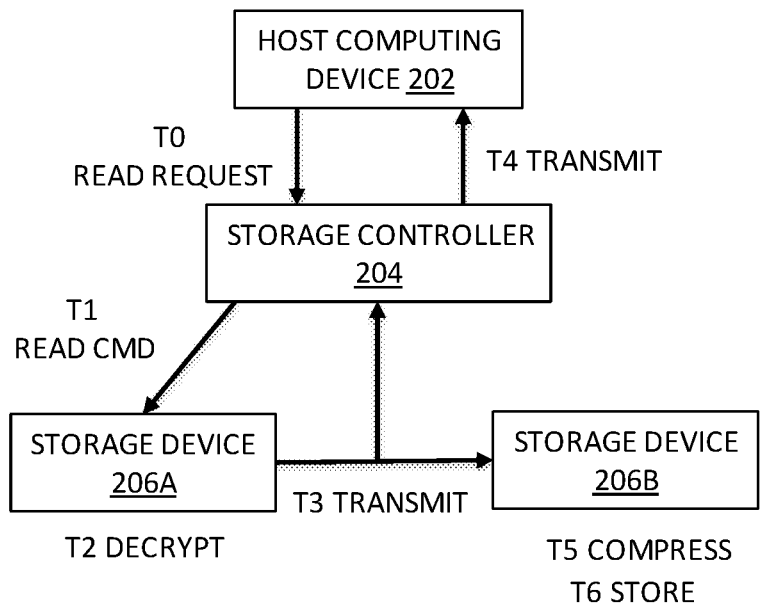
Figure 5J:
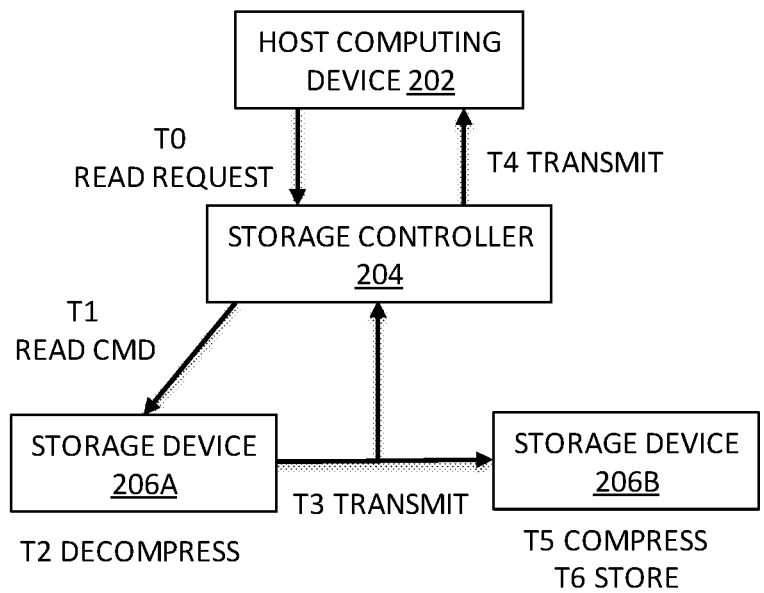
Figure 5K:
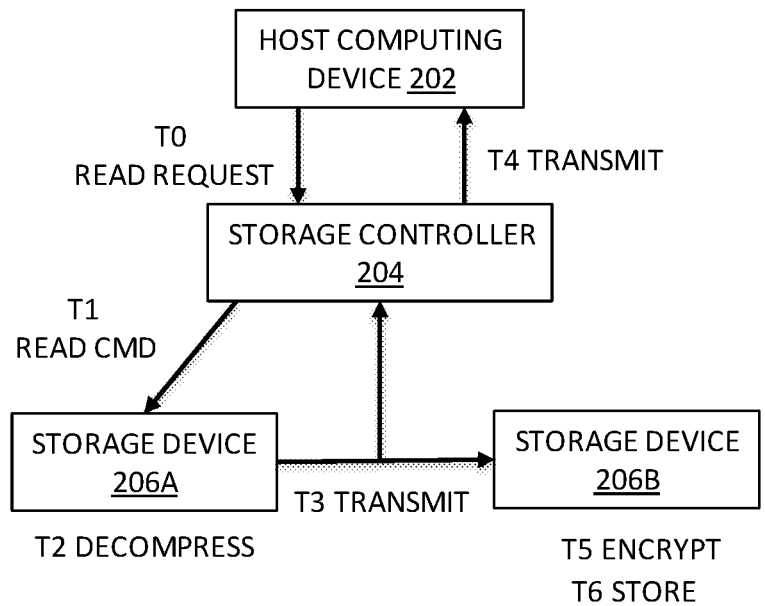
Figure 5L:
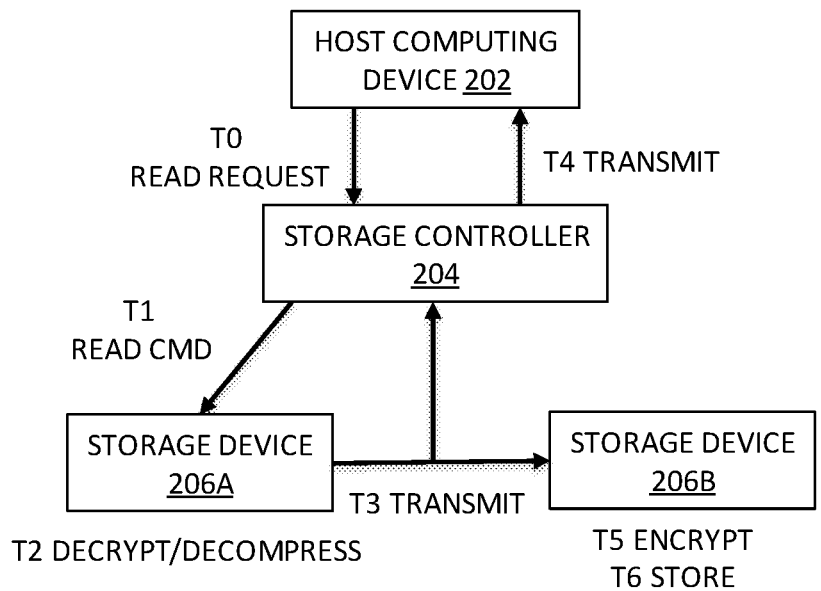
Figure 5M:
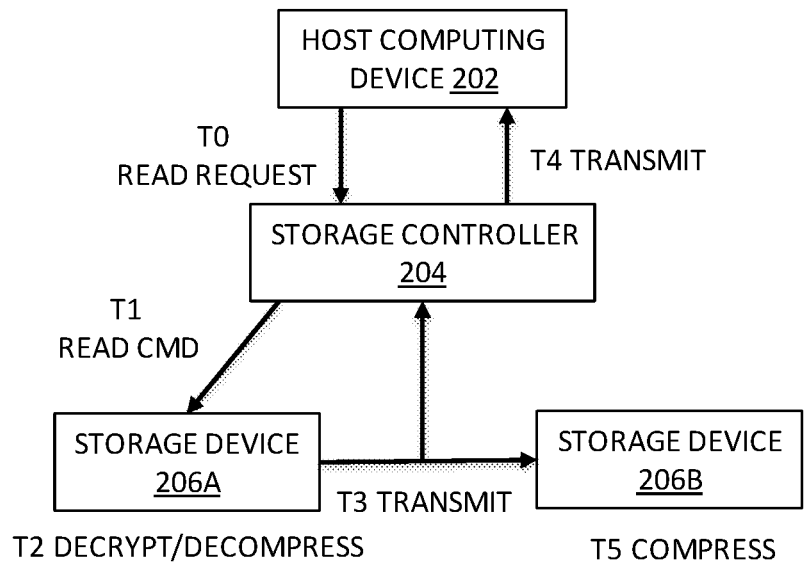
Figure 5N:
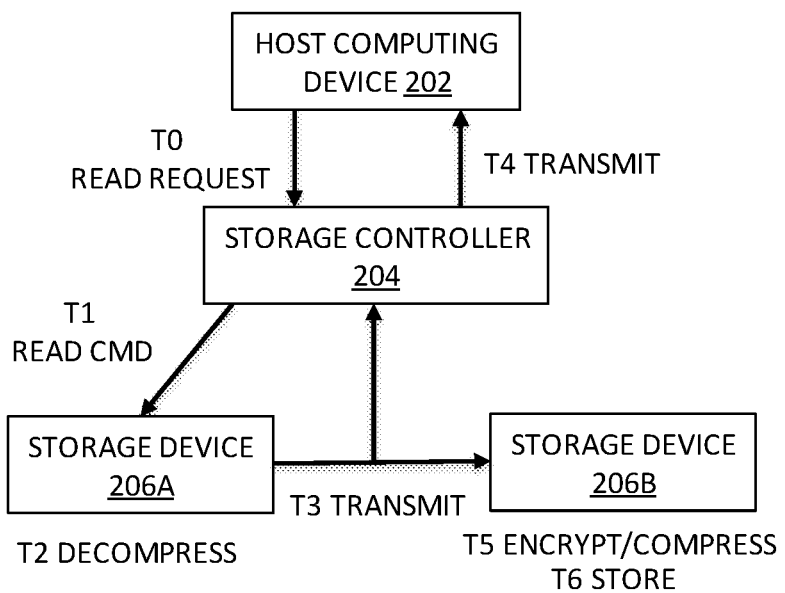
Figure 5O:
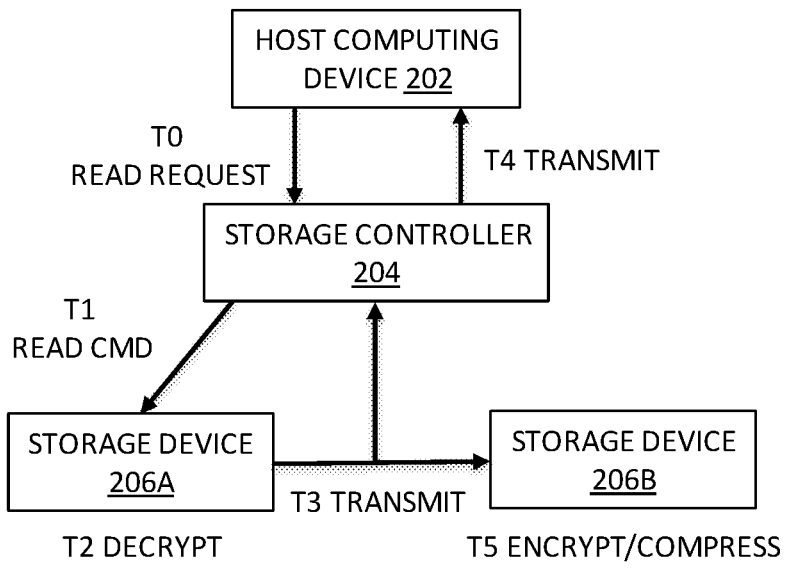
Figure 5P:
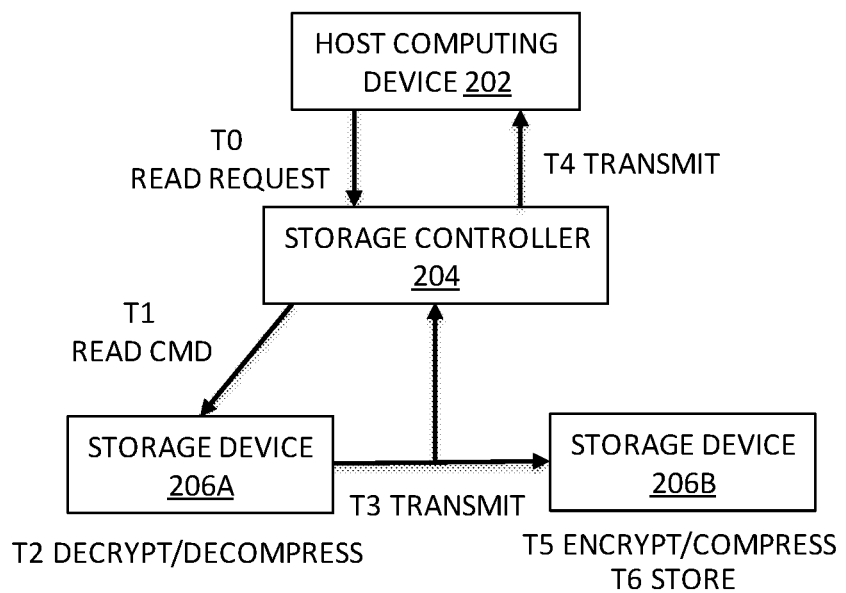

The following non-limiting examples in FIGS. 5A through 5P may be helpful in understanding the principles of various embodiments utilizing data migration with read operations, as discussed herein. These examples are not intended to limit the scope of the various embodiments, but rather to assist in comprehension.

The timing diagram of FIG. 5A illustrates one example of migration operations being performed on a set of storage devices 206 during read operations in which the data in the set of storage devices is not encrypted or compressed. The illustrated example includes two (2) storage devices 206 (e.g., storage device 206A and storage device 206B); however, other embodiments and/or examples may include a greater quantity of storage devices 206.

At time T0, a storage controller 204 receives a read request from a host computing device 202 to read data from a storage device 206A as part of data migration operations from storage device 206A to storage device 206B. In response to receiving the read request, at time T1, the storage controller 204 issues one or more commands to the storage device 206A directing the storage device 206A to read the data to the storage controller 204 and migrate the data to the storage device 206B.

In response to receiving the command(s), the storage device 206A simultaneously or substantially simultaneously transmits the data to the storage controller 204 and the storage device 206B at time T2. At time T3, the storage controller 204 transmits the data to the host computing device 202.

At time T4 and in response to receipt of the data from storage device 206A, the storage device 206B stores and/or saves the data from the storage device 206A therein. In other examples, the operations performed at times T3 and T4 may be reversed or performed in parallel.

The timing diagram of FIG. 5B illustrates another example of migration operations being performed on a set of storage devices 206 during read operations in which the data in the storage device 206A is not encrypted or compressed and the data in the storage device 206B is encrypted and not compressed. At time T0, a storage controller 204 receives a read request from a host computing device 202 to read data from a storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B.

In response to receiving the command(s), the storage device 206A simultaneously or substantially simultaneously transmits the data to the storage controller 204 and the storage device 206B at time T2. At time T3, the storage controller 204 transmits the data to the host computing device 202.

At time T4 and in response to receipt of the data from storage device 206A, the storage device 206B encrypts the data received from the storage controller 206A and, at time T5, stores and/or saves the encrypted data therein. In other examples, the operations performed at time T3 and times T4 and T5 may be reversed and/or performed in parallel.

The timing diagram of FIG. 5C illustrates another example of migration operations being performed on a set of storage devices 206 during read operations in which the data in the storage device 206A is not encrypted or compressed and the data in the storage device 206B is compressed and not encrypted. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B.

In response to receiving the command(s), the storage device 206A simultaneously or substantially simultaneously transmits the data to the storage controller 204 and the storage device 206B at time T2. At time T3, the storage controller 204 transmits the data to the host computing device 202.

At time T4 and in response to receipt of the data from storage device 206A, the storage device 206B compresses the data received from the storage controller 206A and, at time T5, stores and/or saves the compressed data therein. In other examples, the operations performed at time T3 and at times T4 and T5 may be reversed and/or performed in parallel.

The timing diagram of FIG. 5D illustrates another example of migration operations being performed on a set of storage devices 206 during read operations in which the data in the storage device 206A is not encrypted or compressed and the data in the storage device 206B is compressed and encrypted. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B.

In response to receiving the command(s), the storage device 206A simultaneously or substantially simultaneously transmits the data to the storage controller 204 and the storage device 206B at time T2. At time T3, the storage controller 204 transmits the data to the host computing device 202.

At time T4 and in response to receipt of the data from storage device 206A, the storage device 206B compresses and encrypts the data received from the storage controller 206A and, at time T5, stores and/or saves the compressed/encrypted data therein. In other examples, the operations performed at time T3 and at times T4 and T5 may be reversed and/or performed in parallel.

The timing diagram of FIG. 5E illustrates one example of migration operations being performed on a set of storage devices 206 during read operations in which the data in the storage device 206A is encrypted and not compressed and the data in the storage device 206B is not compressed and not encrypted. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B.

In response to receiving the command(s), the storage device 206A decrypts the data at time T2. At time T3, the storage device 206A simultaneously or substantially simultaneously transmits the decrypted data to the storage controller 204 and the storage device 206B.

At time T4, the storage controller 204 transmits the data to the host computing device 202. In response to receipt of the data from storage device 206A, at time T5, the storage device 206B stores and/or saves the data therein. In other examples, the operations performed at times T4 and T5 may be reversed and/or performed in parallel.

The timing diagram of FIG. 5F illustrates one example of migration operations being performed on a set of storage devices 206 during read operations in which the data in the storage device 206A is compressed and not encrypted and the data in the storage device 206B is not compressed and not encrypted. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B.

In response to receiving the command(s), the storage device 206A decompresses the data at time T2. At time T3, the storage device 206A simultaneously or substantially simultaneously transmits the decompressed data to the storage controller 204 and the storage device 206B.

At time T4, the storage controller 204 transmits the data to the host computing device 202. In response to receipt of the data from storage device 206A, at time T5, the storage device 206B stores and/or saves the data therein. In other examples, the operations performed at times T4 and T5 may be reversed and/or performed in parallel.

The timing diagram of FIG. 5G illustrates one example of migration operations being performed on a set of storage devices 206 during read operations in which the data in the storage device 206A is compressed and encrypted and the data in the storage device 206B is not compressed and not encrypted. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B.

In response to receiving the command(s), the storage device 206A decompresses and decrypts the data at time T2. At time T3, the storage device 206A simultaneously or substantially simultaneously transmits the decompressed/decrypted data to the storage controller 204 and the storage device 206B.

At time T4, the storage controller 204 transmits the data to the host computing device 202. In response to receipt of the data from storage device 206A, at time T5, the storage device 206B stores and/or saves the data therein. In other examples, the operations performed at times T4 and T5 may be reversed and/or performed in parallel.

The timing diagram of FIG. 5H illustrates another example of migration operations being performed on a set of storage devices 206 during read operations in which the data in the storage device 206A is encrypted and not compressed and the data in the storage device 206B is encrypted and not compressed. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B. In response to receiving the command(s), the storage device 206A decrypts the data at time T2. At time T3, the storage device 206A simultaneously or substantially simultaneously transmits the decrypted data to the storage controller 204 and the storage device 206B.

At time T4, the storage controller 204 transmits the data to the host computing device 202. In response to receipt of the data from storage device 206A, at time T5, the storage device 206B encrypts the data. At time T6, the storage device 206B stores and/or saves the encrypted data therein. In other examples, the operations performed at T4 and at times T5 and T6 may be reversed and/or performed in parallel.

The timing diagram of FIG. 5I illustrates an example of migration operations being performed on a set of storage devices 206 during read operations in which the data in the storage device 206A is compressed and not encrypted and the data in the storage device 206B is compressed and not encrypted. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B. In response to receiving the command(s), the storage device 206A decrypts the data at time T2. At time T3, the storage device 206A simultaneously or substantially simultaneously transmits the decrypted data to the storage controller 204 and the storage device 206B.

At time T4, the storage controller 204 transmits the data to the host computing device 202. In response to receipt of the data from storage device 206A, at time T5, the storage device 206B compresses the data. At time T6, the storage device 206B stores and/or saves the compressed data therein. In other examples, the operations performed at T4 and at times T5 and T6 may be reversed and/or performed in parallel.

The timing diagram of FIG. 5J illustrates an example of migration operations being performed on a set of storage devices 206 during read operations in which the data in the storage device 206A is encrypted and not compressed and the data in the storage device 206B is compressed and not encrypted. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B. In response to receiving the command(s), the storage device 206A decompresses the data at time T2. At time T3, the storage device 206A simultaneously or substantially simultaneously transmits the decompressed data to the storage controller 204 and the storage device 206B.

At time T4, the storage controller 204 transmits the data to the host computing device 202. In response to receipt of the data from storage device 206A, at time T5, the storage device 206B compresses the data. At time T6, the storage device 206B stores and/or saves the compressed data therein. In other examples, the operations performed at T4 and at times T5 and T6 may be reversed and/or performed in parallel.

The timing diagram of FIG. 5K illustrates an example of migration operations being performed on a set of storage devices 206 during read operations in which the data in the storage device 206A is compressed and not encrypted and the data in the storage device 206B is encrypted and not compressed. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B. In response to receiving the command(s), the storage device 206A decompresses the data at time T2. At time T3, the storage device 206A simultaneously or substantially simultaneously transmits the decompressed data to the storage controller 204 and the storage device 206B.

At time T4, the storage controller 204 transmits the data to the host computing device 202. In response to receipt of the data from storage device 206A, at time T5, the storage device 206B encrypts the data. At time T6, the storage device 206B stores and/or saves the encrypted data therein. In other examples, the operations performed at T4 and at times T5 and T6 may be reversed and/or performed in parallel.

The timing diagram of FIG. 5L illustrates an example of migration operations being performed on a set of storage devices 206 during read operations in which the data in the storage device 206A is compressed and encrypted and the data in the storage device 206B is encrypted and not compressed. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B. In response to receiving the command(s), the storage device 206A decrypts and decompresses the data at time T2. At time T3, the storage device 206A simultaneously or substantially simultaneously transmits the decrypted/decompressed data to the storage controller 204 and the storage device 206B.

At time T4, the storage controller 204 transmits the data to the host computing device 202. In response to receipt of the data from storage device 206A, at time T5, the storage device 206B encrypts the data. At time T6, the storage device 206B stores and/or saves the encrypted data therein. In other examples, the operations performed at T4 and at times T5 and T6 may be reversed and/or performed in parallel.

The timing diagram of FIG. 5M illustrates an example of migration operations being performed on a set of storage devices 206 during read operations in which the data in the storage device 206A is compressed and encrypted and the data in the storage device 206B is compressed and not encrypted. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B. In response to receiving the command(s), the storage device 206A decrypts and decompresses the data at time T2. At time T3, the storage device 206A simultaneously or substantially simultaneously transmits the decrypted/decompressed data to the storage controller 204 and the storage device 206B.

At time T4, the storage controller 204 transmits the data to the host computing device 202. In response to receipt of the data from storage device 206A, at time T5, the storage device 206B compresses the data. At time T6, the storage device 206B stores and/or saves the compressed data therein. In other examples, the operations performed at T4 and at times T5 and T6 may be reversed and/or performed in parallel.

The timing diagram of FIG. 5N illustrates another example of migration operations being performed on a set of storage devices 206 during read operations in which the data in the storage device 206A is compressed and not encrypted and the data in the storage device 206B is encrypted and compressed. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B. In response to receiving the command(s), the storage device 206A decompresses the data at time T2. At time T3, the storage device 206A simultaneously or substantially simultaneously transmits the decompressed data to the storage controller 204 and the storage device 206B.

At time T4, the storage controller 204 transmits the data to the host computing device 202. In response to receipt of the data from storage device 206A, at time T5, the storage device 206B encrypts and compresses the data. At time T6, the storage device 206B stores and/or saves the encrypted/compressed data therein. In other examples, the operations performed at T4 and at times T5 and T6 may be reversed and/or performed in parallel.

The timing diagram of FIG. 5O illustrates yet another example of migration operations being performed on a set of storage devices 206 during read operations in which the data in the storage device 206A is encrypted and not compressed and the data in the storage device 206B is encrypted and compressed. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B. In response to receiving the command(s), the storage device 206A decrypts the data at time T2. At time T3, the storage device 206A simultaneously or substantially simultaneously transmits the decrypted data to the storage controller 204 and the storage device 206B.

At time T4, the storage controller 204 transmits the data to the host computing device 202. In response to receipt of the data from storage device 206A, at time T5, the storage device 206B encrypts and compresses the data. At time T6, the storage device 206B stores and/or saves the encrypted/compressed data therein. In other examples, the operations performed at T4 and at times T5 and T6 may be reversed and/or performed in parallel.

The timing diagram of FIG. 5P illustrates another example of migration operations being performed on a set of storage devices 206 during read operations in which the data in the storage device 206A is encrypted and compressed and the data in the storage device 206B is also encrypted and compressed. At time T0, a storage controller 204 receives a read request from a host computing device 202 to read data from storage device 206A as part of data migration operations from storage device 206A to storage device 206B.

In response to receiving the read request, at time T1, the storage controller 204 issues one or more commands to the storage device 206A directing the storage device 206A to read the data to the storage controller 204 and migrate the data to the storage device 206B. In response to receiving the command(s), the storage device 206A decrypts and decompresses the data at time T2. At time T3, the storage device 206A simultaneously or substantially simultaneously transmits the decrypted/decompressed data to the storage controller 204 and the storage device 206B.

At time T4, the storage controller 204 transmits the data to the host computing device 202. In response to receipt of the data from storage device 206A, at time T5, the storage device 206B encrypts and compresses the data. At time T6, the storage device 206B stores and/or saves the encrypted/compressed data therein. In other examples, the operations performed at T4 and at times T5 and T6 may be reversed and/or performed in parallel.

Figure 6A:
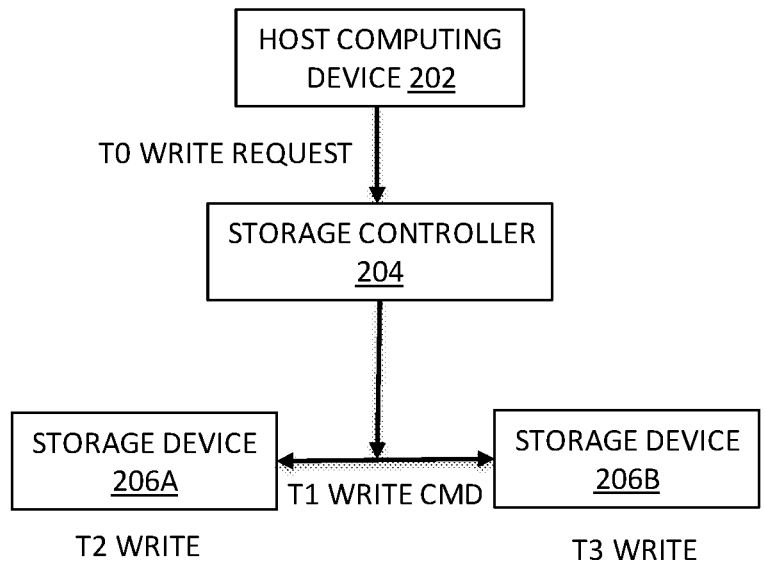
FIGS. 6A through 6P illustrate timing diagrams of various embodiments of migrating data between storage devices during write operations.
Figure 6B:
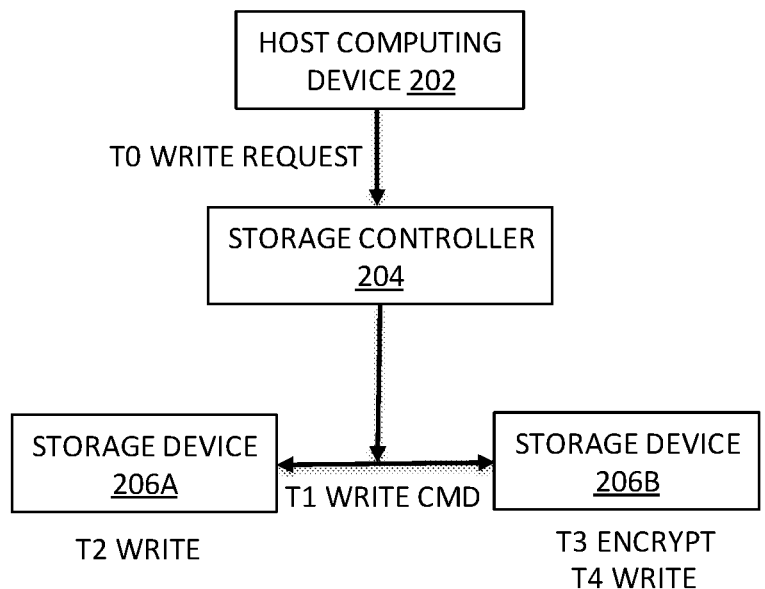
Figure 6C:
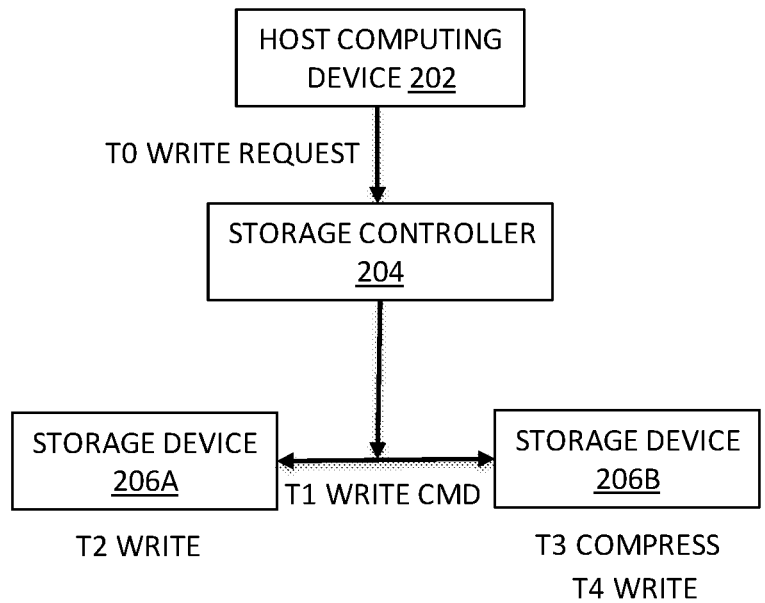
Figure 6D:
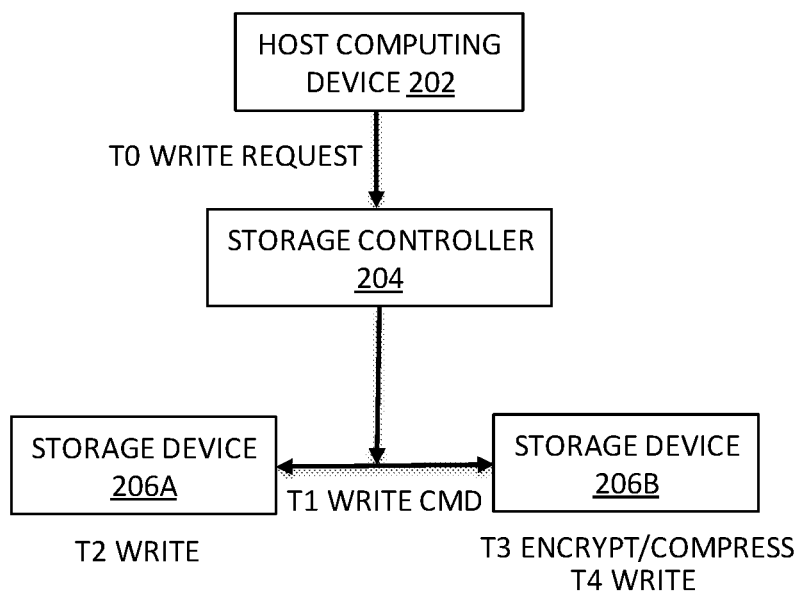
Figure 6E:
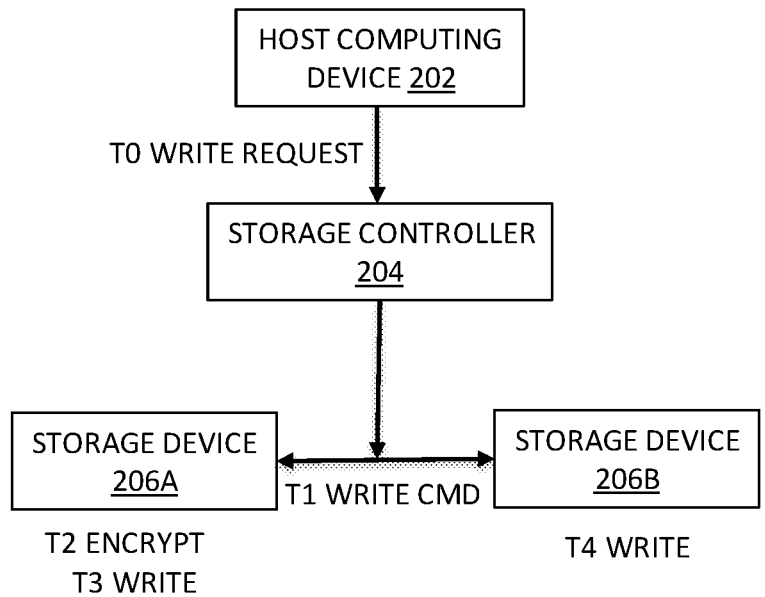
Figure 6F:
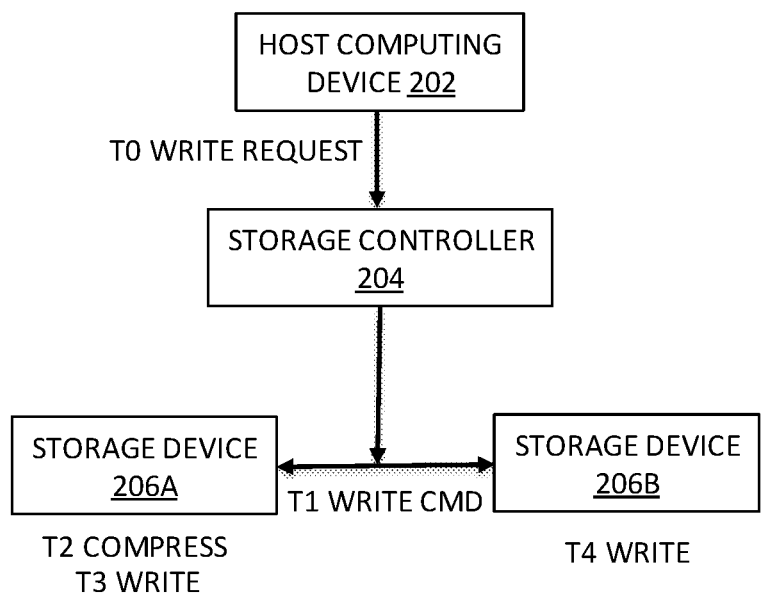
Figure 6G:
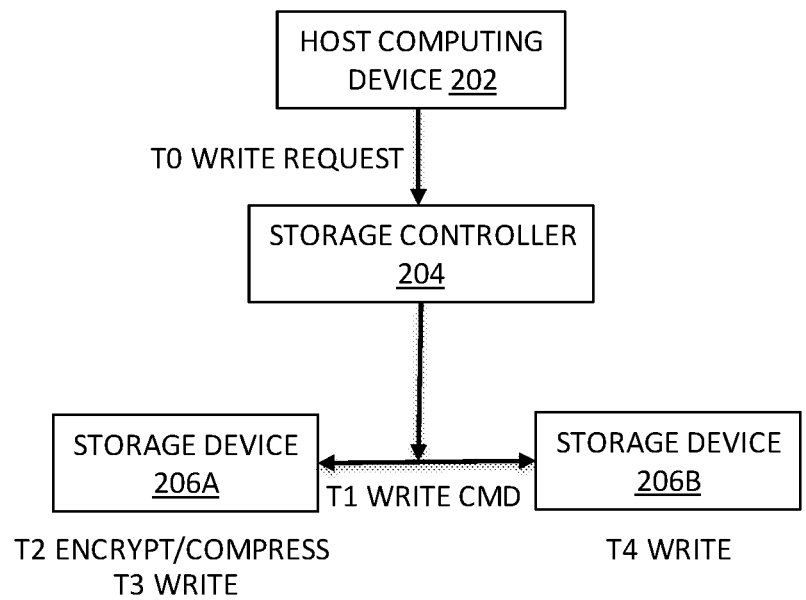
Figure 6H:
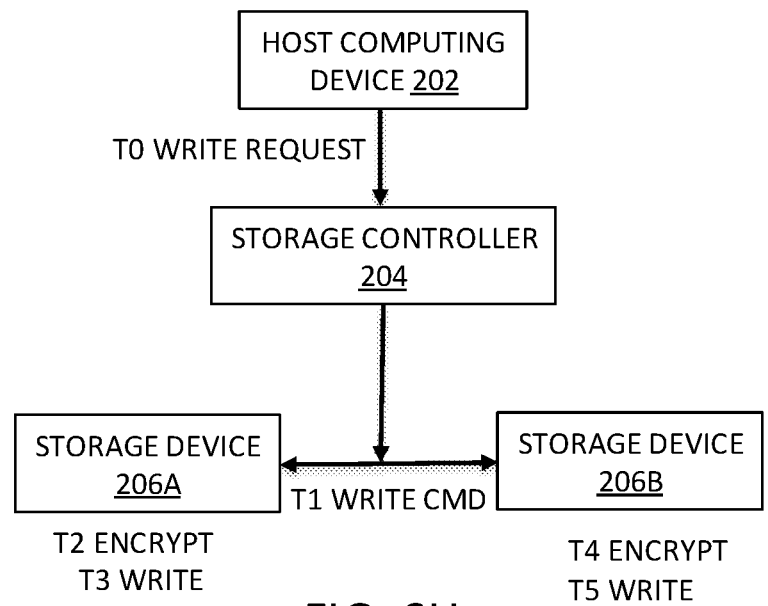
Figure 6I:
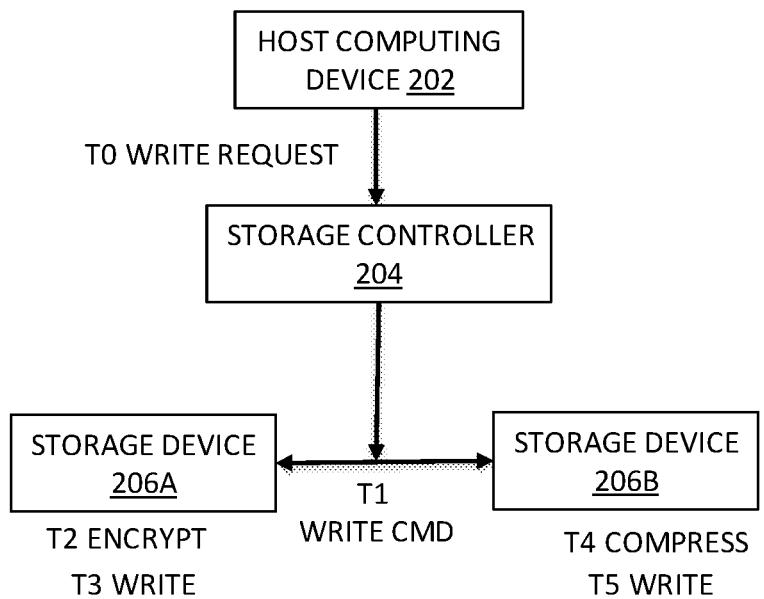
Figure 6J:
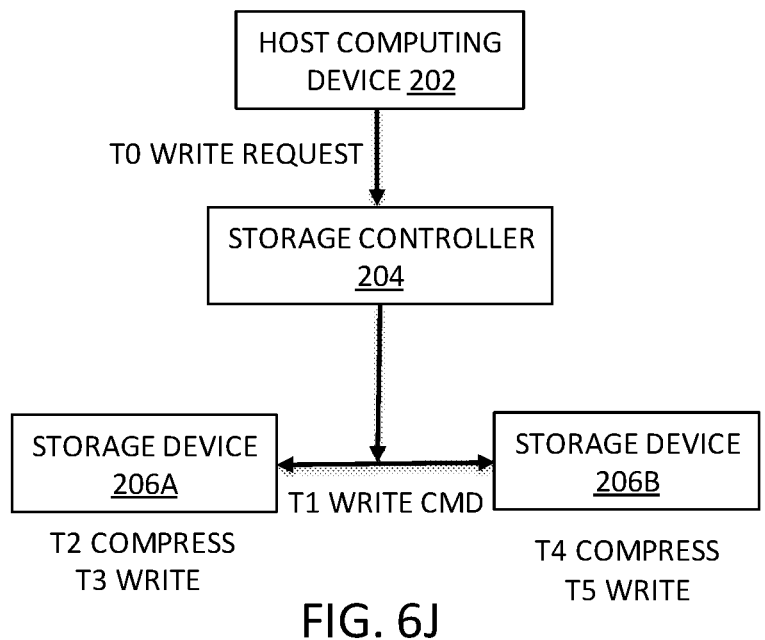
Figure 6K:
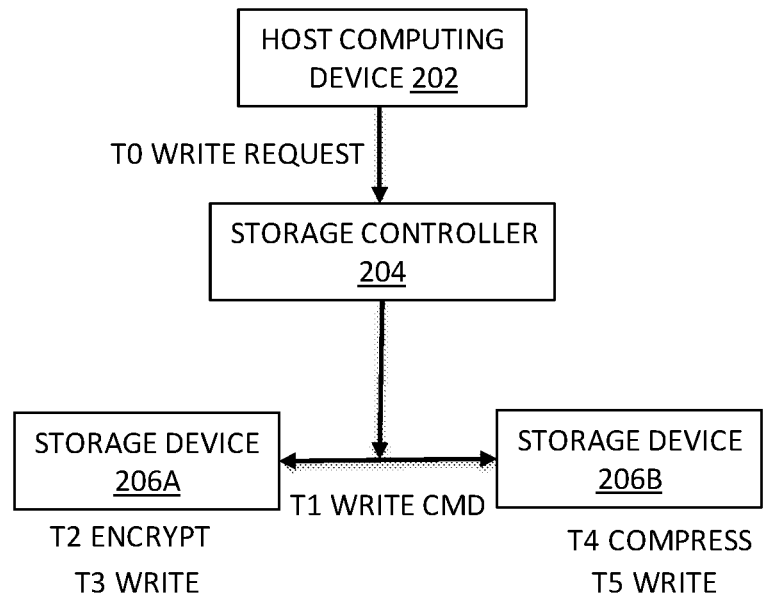
Figure 6L:
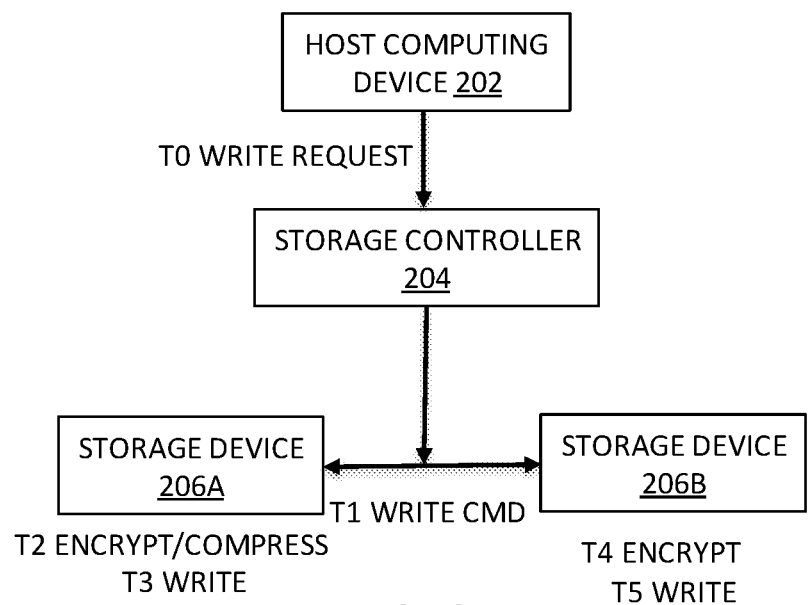
Figure 6M:
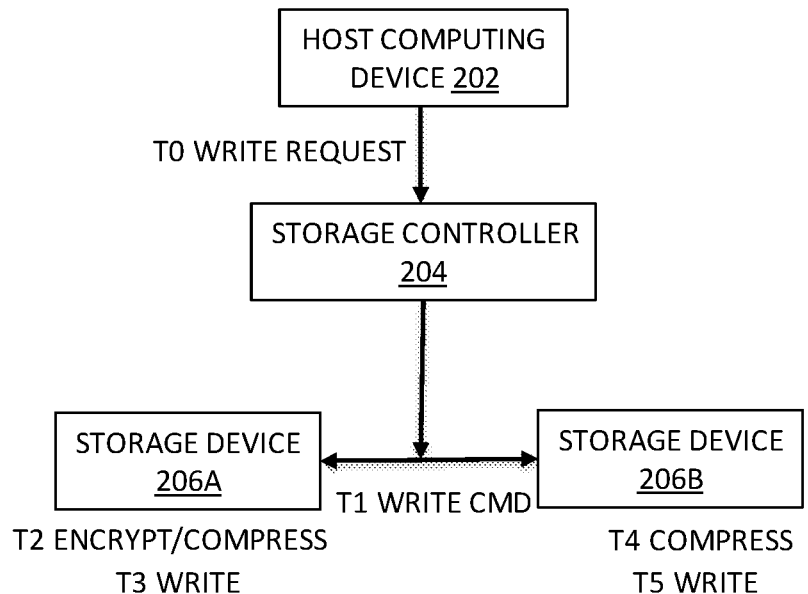
Figure 6N:
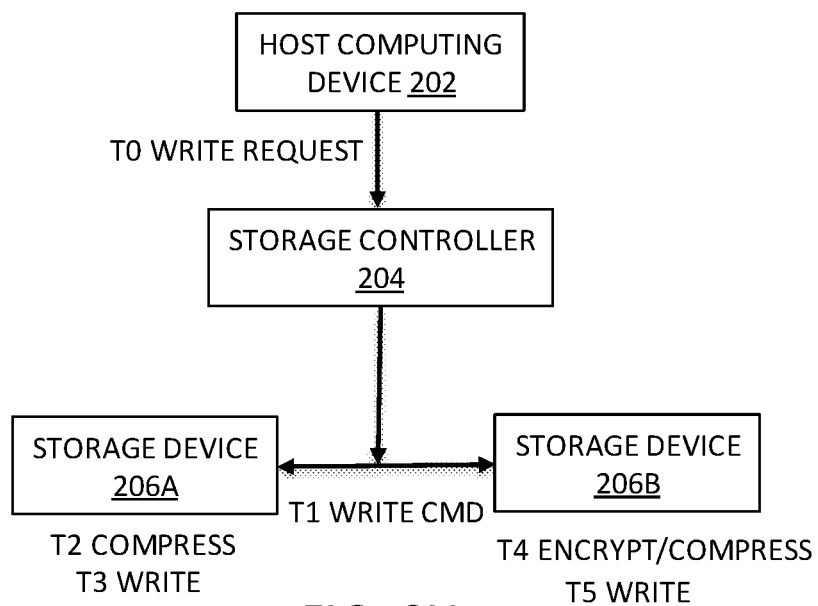
Figure 6O:
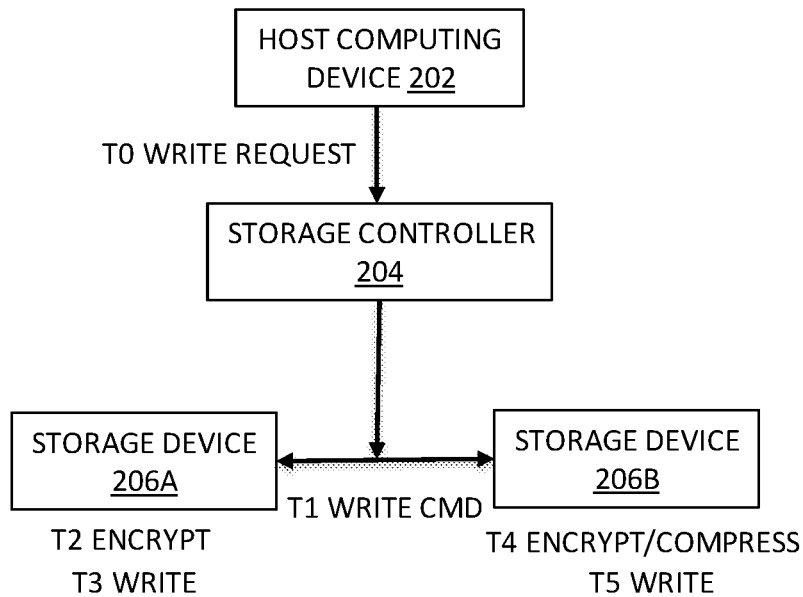
Figure 6P:
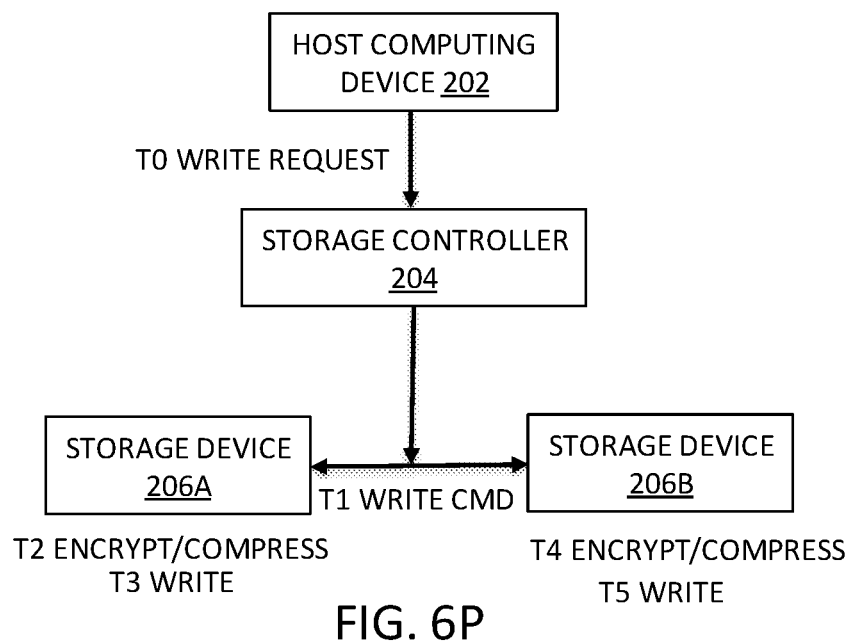

The following non-limiting examples in FIGS. 6A through 6P may be helpful in understanding the principles of various embodiments utilizing data migration with write operations, as discussed herein. These examples are not intended to limit the scope of the various embodiments, but rather to assist in comprehension.

The timing diagram of FIG. 6A illustrates one example of migration operations being performed on a set of storage devices 206 during write operations in which the data in the set of storage devices is not encrypted or compressed. The illustrated example includes two (2) storage devices 206 (e.g., storage device 206A and storage device 206B); however, other embodiments and/or examples may include a greater quantity of storage devices 206.

At time T0, a storage controller 204 receives a write request from a host computing device 202 to write data to a storage 206A. In response to receiving the write request, at time T1, the storage controller 204 simultaneously or substantially simultaneously issues write commands to the storage device 206A and the storage device 206B to write the data respectively therein as part of data migration operations from storage device 206A to storage device 206B.

In response to receiving the command(s), the storage device 206A writes the transmitted data therein at time T2. At time T3, the storage device 206B writes the transmitted data therein. In other examples, the operations performed at times T2 and T3 may be reversed or performed in parallel.

The timing diagram of FIG. 6B illustrates another example of migration operations being performed on a set of storage devices 206 during write operations in which the data in the storage device 206A is not encrypted or compressed and the data in the storage device 206B is encrypted and not compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A writes the data therein at time T2.

At time T3, the storage device 206B encrypts the data and writes the encrypted data therein at time T4. In other examples, the operations performed at time T2 and times T3 and T4 may be reversed and/or performed in parallel.

The timing diagram of FIG. 6C illustrates another example of migration operations being performed on a set of storage devices 206 during write operations in which the data in the storage device 206A is not encrypted or compressed and the data in the storage device 206B is compressed and not encrypted. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A writes the data therein at time T2.

At time T3, the storage device 206B compresses the data and writes the encrypted data therein at time T4. In other examples, the operations performed at time T2 and times T3 and T4 may be reversed and/or performed in parallel.

The timing diagram of FIG. 6D illustrates another example of migration operations being performed on a set of storage devices 206 during write operations in which the data in the storage device 206A is not encrypted or compressed and the data in the storage device 206B is encrypted and compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A writes the data therein at time T2.

At time T3, the storage device 206B encrypts and compresses the data and writes the encrypted/compressed data therein at time T4. In other examples, the operations performed at time T2 and times T3 and T4 may be reversed and/or performed in parallel.

The timing diagram of FIG. 6E illustrates an example of migration operations being performed on a set of storage devices 206 during write operations in which the data in the storage device 206A is encrypted and not compressed and the data in the storage device 206B is not encrypted and not compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A encrypts the data at time T2 and writes the encrypted data therein at time T3.

At time T4, the storage device 206B writes the data therein. In other examples, the operations performed at times T2 and T3 and at time T4 may be reversed and/or performed in parallel.

The timing diagram of FIG. 6F illustrates an example of migration operations being performed on a set of storage devices 206 during write operations in which the data in the storage device 206A is compressed and not encrypted and the data in the storage device 206B is not encrypted and not compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A compresses the data at time T2 and writes the compressed data therein at time T3.

At time T4, the storage device 206B writes the data therein. In other examples, the operations performed at times T2 and T3 and at time T4 may be reversed and/or performed in parallel.

The timing diagram of FIG. 6G illustrates an example of migration operations being performed on a set of storage devices 206 during write operations in which the data in the storage device 206A is compressed and encrypted and the data in the storage device 206B is not encrypted and not compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A encrypts and compresses the data at time T2 and writes the encrypted/compressed data therein at time T3.

At time T4, the storage device 206B writes the data therein. In other examples, the operations performed at times T2 and T3 and at time T4 may be reversed and/or performed in parallel.

The timing diagram of FIG. 6H illustrates an example of migration operations being performed on a set of storage devices 206 during write operations in which the data in the storage device 206A is encrypted and not compressed and the data in the storage device 206B is encrypted and not compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A encrypts the data at time T2 and writes the encrypted data therein at time T3.

At time T4, the storage device 206B encrypts the data and writes the encrypted data therein at time T5. In other examples, the operations performed at times T2 and T3 and at times T4 and T5 may be reversed and/or performed in parallel.

The timing diagram of FIG. 6I illustrates an example of migration operations being performed on a set of storage devices 206 during write operations in which the data in the storage device 206A is encrypted and not compressed and the data in the storage device 206B is compressed and not encrypted. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A encrypts the data at time T2 and writes the encrypted data therein at time T3.

At time T4, the storage device 206B compresses the data and writes the compressed data therein at time T5. In other examples, the operations performed at times T2 and T3 and at times T4 and T5 may be reversed and/or performed in parallel.

The timing diagram of FIG. 6J illustrates an example of migration operations being performed on a set of storage devices 206 during write operations in which the data in the storage device 206A is compressed and not encrypted and the data in the storage device 206B is compressed and not encrypted. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A compresses the data at time T2 and writes the compressed data therein at time T3.

At time T4, the storage device 206B compresses the data and writes the compressed data therein at time T5. In other examples, the operations performed at times T2 and T3 and at times T4 and T5 may be reversed and/or performed in parallel.

The timing diagram of FIG. 6K illustrates an example of migration operations being performed on a set of storage devices 206 during write operations in which the data in the storage device 206A is compressed and not encrypted and the data in the storage device 206B is encrypted and not compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A compresses the data at time T2 and writes the compressed data therein at time T3.

At time T4, the storage device 206B encrypts the data and writes the encrypted data therein at time T5. In other examples, the operations performed at times T2 and T3 and at times T4 and T5 may be reversed and/or performed in parallel.

The timing diagram of FIG. 6L illustrates an example of migration operations being performed on a set of storage devices 206 during write operations in which the data in the storage device 206A is compressed and encrypted and the data in the storage device 206B is encrypted and not compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A encrypts and compresses the data at time T2 and writes the encrypted/compressed data therein at time T3.

At time T4, the storage device 206B encrypts the data and writes the encrypted data therein at time T5. In other examples, the operations performed at times T2 and T3 and at times T4 and T5 may be reversed and/or performed in parallel.

The timing diagram of FIG. 6M illustrates an example of migration operations being performed on a set of storage devices 206 during write operations in which the data in the storage device 206A is compressed and encrypted and the data in the storage device 206B is compressed and not encrypted. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A encrypts and compresses the data at time T2 and writes the encrypted/compressed data therein at time T3.

At time T4, the storage device 206B compresses the data and writes the compressed data therein at time T5. In other examples, the operations performed at times T2 and T3 and at times T4 and T5 may be reversed and/or performed in parallel.

The timing diagram of FIG. 6N illustrates an example of migration operations being performed on a set of storage devices 206 during write operations in which the data in the storage device 206A is compressed and not encrypted and the data in the storage device 206B is encrypted and compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A compresses the data at time T2 and writes the compressed data therein at time T3.

At time T4, the storage device 206B encrypts and compresses the data and writes the encrypted/compressed data therein at time T5. In other examples, the operations performed at times T2 and T3 and at times T4 and T5 may be reversed and/or performed in parallel.

The timing diagram of FIG. 6O illustrates an example of migration operations being performed on a set of storage devices 206 during write operations in which the data in the storage device 206A is encrypted and not compressed and the data in the storage device 206B is encrypted and compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A encrypts the data at time T2 and writes the encrypted data therein at time T3.

At time T4, the storage device 206B encrypts and compresses the data and writes the encrypted/compressed data therein at time T5. In other examples, the operations performed at times T2 and T3 and at times T4 and T5 may be reversed and/or performed in parallel.

The timing diagram of FIG. 6P illustrates an example of migration operations being performed on a set of storage devices 206 during write operations in which the data in the storage device 206A is encrypted and compressed and the data in the storage device 206B is encrypted and compressed. At time T0, a storage controller 204 receives a write request from a host computing device 202 to write data to a storage 206A.

In response to receiving the write request, at time T1, the storage controller 204 simultaneously or substantially simultaneously issues write commands to the storage device 206A and the storage device 206B to write the data respectively therein as part of data migration operations from storage device 206A to storage device 206B. In response to receiving the write command, the storage device 206A encrypts and compresses the data at time T2 and writes the encrypted/compressed data therein at time T3.

At time T4, the storage device 206B encrypts and compresses the data and writes the encrypted/compressed data therein at time T5. In other examples, the operations performed at times T2 and T3 and at times T4 and T5 may be reversed and/or performed in parallel.

With reference to FIG. 7, FIG. 7 is a schematic flow chart diagram illustrating one embodiment of a method 700 for migrating data during read operations. At least in the illustrated embodiment, method 700 can begin by a processor (e.g., processor 300A or processor 300B (also simply referred individually, in various groups, or collectively as processor(s) 300)) of a storage device (e.g., storage device 206A) receiving an I/O command and/or request (e.g., a read command and/or read request) from a storage controller (e.g., storage controller 204) (block 702).

In response to receiving the I/O command, the processor 300 can simultaneously or substantially simultaneously transmit the data in the read command to the storage controller 204 and to another storage device (e.g., storage device 206B) (block 704). In this manner, data stored in the storage device 206A can be simultaneously or substantially simultaneously read to the storage controller 204 and migrated to the storage device 206B.

Referring to FIG. 8, FIG. 8 is a schematic flow chart diagram illustrating another embodiment of a method 800 for migrating data during read operations. At least in the illustrated embodiment, method 800 can begin by a processor (e.g., processor 300A or processor 300B (also simply referred individually, in various groups, or collectively as processor(s) 300)) of a storage device (e.g., storage device 206A) receiving an I/O command and/or request (e.g., a read command and/or read request) from a storage controller (e.g., storage controller 204) (block 802).

In response to receiving the I/O command, the processor 300 can read the data from a computer-useable medium (block 804). The processor 300 may determine if the data is encrypted (block 806).

In response to determining that the data is encrypted (e.g., a "YES" in block 806), the processor 300 (e.g., a data modification module 306) can decrypt the data (block 808) and can further determine if the data is compressed (block 810). In response to determining that the data is not encrypted (e.g., a "NO" in block 806), the processor 300 can further determine if the data is compressed (block 810).

In response to determining that the data is compressed (e.g., a "YES" in block 810), the processor 300 (e.g., a data modification module 306) can decompress the data (block 812) and can simultaneously or substantially simultaneously transmit the data in the read command to the storage controller 204 and to another storage device (e.g., storage device 206B) (block 814). In response to determining that the data is not compressed (e.g., a "NO" in block 810), the processor can simultaneously or substantially simultaneously transmit the data in the read command to the storage controller 204 and to the storage device 206B (block 814). In this manner, data stored in the storage device 206A can be simultaneously or substantially simultaneously read to the storage controller 204 and migrated to the storage device 206B.

With reference to FIG. 9, FIG. 9 is a schematic flow chart diagram illustrating one embodiment of a method 900 for migrating data during write operations. At least in the illustrated embodiment, method 900 can begin by a storage controller (e.g., storage controller 204) receiving an I/O command and/or request (e.g., a write command and/or write request) from a host computing device (e.g., host computing device 202) (block 902).

In response to receiving the I/O command, the storage controller 204 can simultaneously or substantially simultaneously transmit a write command to two or more storage devices (e.g., storage devices 206A and 206B) (block 904). In this manner, data being written to for storage in, for example, the storage device 206A can be simultaneously or substantially simultaneously written to the storage device 206B as a portion of a data migration process migrating data from the storage device 206A to the storage device 206B.

Referring to FIG. 10, FIG. 10 is a schematic flow chart diagram illustrating another embodiment of a method 1000 for migrating data during write operations. At least in the illustrated embodiment, method 1000 can begin by a processor (e.g., processor 300A or processor 300B (also simply referred individually, in various groups, or collectively as processor(s) 300)) of a storage device (e.g., storage device 206A or storage device 206B (also simply referred individually, in various groups, or collectively as storage device(s) 206)) receiving an I/O command and/or request (e.g., a write command and/or write request) from a storage controller (e.g., storage controller 204) (block 1002).

In response to receiving the write command, the processor 300 can encrypt the data in the write command (block 1004) and/or compress the data in the write command (block 1006). The processor 300 may then write the encrypted and/or compressed data to a computer-useable storage medium in the storage device (block 1008).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. A method, comprising:
  receiving, by a processor, an input/output (I/O) request from a host computing device in a storage system; and
  in response to receiving the I/O request:
    performing a set of corresponding I/O operations for data associated with the received I/O request on a first storage device in the storage system, and
    simultaneously in a same clock cycle with performance of the set of corresponding I/O operations on the first storage device, transmitting and writing the data associated with the I/O request to a second storage device in the storage system for storage on the second storage device;
  wherein:
    the data written to the second storage device is from the first storage device when the I/O request is a read request,
    the data is from a storage controller and is written to the first storage device and the second storage device when the I/O request is a write request,
    the storage controller receives the I/O request from the host computing device, and
    the host computing device, the first storage device, and the second storage device are included in a same storage system.

2. The method of claim 1, wherein:
  the I/O request is the read request and the read request is directed to the storage controller;
  performing the set of corresponding I/O operations comprises reading the data from the first storage device to the storage controller;
  simultaneously transmitting the data comprises simultaneously migrating the data from the first storage device to the second storage device;
  the host computing device comprises a storage virtualization controller; and
  the storage controller comprises the processor.

3. The method of claim 2, further comprising:
  decrypting the data prior to reading the data from the first storage device to the storage controller and migrating the data from the first storage device to the second storage device.

4. The method of claim 2, further comprising:
  decompressing the data prior to reading the data from the first storage device to the storage controller and migrating the data from the first storage device to the second storage device.

5. The method of claim 4, further comprising:
  decrypting the data prior to reading the data from the first storage device to the storage controller and migrating the data from the first storage device to the second storage device.

6. The method of claim 1, wherein:
  the I/O request is the write request and the write request is directed to the storage controller;
  performing the set of corresponding I/O operations comprises writing the data from the storage controller to the first storage device;
  simultaneously transmitting the data comprises writing the data from the storage controller to the second storage device simultaneously with writing the data from the storage controller to the first storage device;
  the host computing device comprises a storage virtualization controller; and
  the storage controller comprises the processor.

7. The method of claim 6, further comprising:
  compressing the data prior to simultaneously writing the data from the storage controller to the first storage device and the second storage device.

8. A computer program product comprising a computer-readable storage medium including program instructions embodied therewith, the program instructions executable by a processor to cause the processor to:
  receive an input/output (I/O) request from a host computing device in a storage system; and
  in response to receiving the I/O request:
    perform a set of corresponding I/O operations for data associated with the received I/O request on a first storage device in the storage system, and
    simultaneously in a same clock cycle with performance of the set of corresponding I/O operations on the first storage device, transmit and write the data associated with the I/O request to a second storage device in the storage system for storage on the second storage device,
  wherein:
    the data written to the second storage device is from the first storage device when the I/O request is a read request,
    the data is from a storage controller and is written to the first storage device and the second storage device when the I/O request is a write request,
    the storage controller receives the I/O request from the host computing device, and
    the host computing device, the first storage device, and the second storage device are included in a same storage system.

9. The computer program product of claim 8, wherein:
  the I/O request is the read request and the read request is directed to the storage controller;
  performing the set of corresponding I/O operations comprises reading the data from the first storage device to the storage controller;

simultaneously transmitting the data comprises simultaneously migrating the data from the first storage device to the second storage device;
the host computing device comprises a storage virtualization controller; and
the storage controller comprises the processor.

10. The computer program product of claim 9, wherein the program instructions further cause the processor to one or more of:
decrypt the data prior to reading the data from the first storage device to the storage controller and migrating the data from the first storage device to the second storage device; and
decompress the data prior to reading the data from the first storage device to the storage controller and migrating the data from the first storage device to the second storage device.

11. The computer program product of claim 8, wherein:
the I/O request is the write request and the write request is directed to the storage controller;
performing the set of corresponding I/O operations comprises writing the data from the storage controller to the first storage device;
simultaneously transmitting the data comprises writing the data from the storage controller to the second storage device simultaneously with writing the data from the storage controller to the first storage device;
the host computing device comprises a storage virtualization controller; and
the storage controller comprises the processor.

12. The computer program product of claim 11, wherein the program instructions further cause the processor to:
compress the data prior to simultaneously writing the data from the storage controller to the first storage device and the second storage device.

13. An apparatus, comprising:
an input/output (I/O) module that:
receives an I/O request from a host computing device in a storage system, and
in response to the received I/O request, performs a set of corresponding I/O operations for data associated with the received I/O request on a first storage device in the storage system; and
a data migration module that, in response to the received I/O request and simultaneously in a same clock cycle with performance of the set of corresponding I/O operations on the first storage device, simultaneously transmits and writes the data associated with the received I/O request to a second storage device in the storage system for storage on the second storage device,
wherein:
the data written to the second storage device is from the first storage device when the I/O request is a read request,
the data is from a storage controller and is written to the first storage device and the second storage device when the I/O request is a write request,
the storage controller receives the I/O request from the host computing device,
the host computing device, the first storage device, and the second storage device are included in a same storage system, and
at least a portion of each of said modules comprises one or more of a set of hardware circuits, a set of programmable hardware devices, and executable code stored on a set of computer-readable storage media.

14. The apparatus of claim 13, wherein:
the I/O request is the read request and the read request is directed to the storage controller;
performing the set of corresponding I/O operations comprises reading the data from the first storage device to the storage controller;
simultaneously transmitting the data comprises simultaneously migrating the data from the first storage device to the second storage device;
the host computing device comprises a storage virtualization controller; and
the storage controller comprises said modules.

15. The apparatus of claim 14, further comprising:
a data modification module that modifies the data prior to transmitting the data to the second storage device and the storage virtualization controller.

16. The apparatus of claim 15, wherein:
the data modification module comprises a security engine that decrypts data; and
modifying the data comprises decrypting the data prior to transmitting the data to the second storage device and the storage virtualization controller.

17. The apparatus of claim 15, wherein:
the data modification module comprises a compression engine that decompresses data; and
modifying the data comprises decompressing the data prior to transmitting the data to the second storage device and the storage virtualization controller.

18. The apparatus of claim 17, wherein:
the data modification module further comprises a security engine that decrypts data; and
modifying the data further comprises decrypting the data prior to transmitting the data to the second storage device and the storage virtualization controller.

19. The apparatus of claim 13, wherein:
the I/O request is the write request and the write request is directed to the storage controller;
performing the set of corresponding I/O operations comprises writing the data from the storage controller to the first storage device;
simultaneously transmitting the data comprises writing the data from the storage controller to the second storage device simultaneously with writing the data from the storage controller to the first storage device;
the host computing device comprises a storage virtualization controller; and
the storage controller comprises said modules.

20. The apparatus of claim 19, further comprising:
a compression module that compresses the data prior to simultaneously writing the data from the storage controller to the first storage device and the second storage device.

* * * * *